(12) United States Patent
Lin et al.

(10) Patent No.: US 11,677,606 B2
(45) Date of Patent: *Jun. 13, 2023

(54) DATA TRANSMISSION METHOD AND APPARATUS IN WIRELESS LOCAL AREA NETWORK

(71) Applicant: Huawei Technologies Co., Ltd., Shenzhen (CN)

(72) Inventors: Wei Lin, Shenzhen (CN); Xin Xue, Shenzhen (CN); Ningjuan Wang, Shenzhen (CN); Le Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

This patent is subject to a terminal disclaimer.

(21) Appl. No.: 17/246,182

(22) Filed: Apr. 30, 2021

(65) Prior Publication Data

US 2021/0328849 A1 Oct. 21, 2021

Related U.S. Application Data

(63) Continuation of application No. 16/870,570, filed on May 8, 2020, now Pat. No. 10,999,119, which is a (Continued)

(30) Foreign Application Priority Data

Nov. 23, 2015 (CN) .......................... 201510823977.8
Nov. 30, 2015 (CN) .......................... 201510854631.4

(51) Int. Cl.
*H04W 72/12* (2023.01)
*H04L 27/26* (2006.01)
(Continued)

(52) U.S. Cl.
CPC ........ *H04L 27/2672* (2013.01); *H04L 25/022* (2013.01); *H04L 25/0226* (2013.01);
(Continued)

(58) Field of Classification Search
None
See application file for complete search history.

(56) References Cited

U.S. PATENT DOCUMENTS 8,693,356 B2   4/2014  Cheng-Hsuan et al.
8,917,784 B2  12/2014  Yang et al.
(Continued)

FOREIGN PATENT DOCUMENTS

CN   101433038 A    5/2009
CN   101610543 A   12/2009
(Continued)

OTHER PUBLICATIONS

Intel et al. WF on LAA UL LBT, 3GPP TSG RAN WG1 #81, R1-153565, Fukuoka, Japan, May 25-29, 2015, total 4 pages.
(Continued)

*Primary Examiner* — Brandon M Renner
(74) *Attorney, Agent, or Firm* — Leydig, Voit & Mayer, Ltd.

(57) ABSTRACT

An HE-LTF transmission method is provided, including: determining, based on a total number $N_{STS}$ of space-time streams, a number $N_{HELTF}$ of OFDM symbols included in an HE-LTF field; determining a HE-LTF sequence in frequency domain according to a transmission bandwidth and a mode of the HE-LTF field, where the HE-LTF sequence in frequency domain includes but is not limited to a mode of the HE-LTF field sequence that is in a 1× mode and that is mentioned in implementations; and sending a time-domain signal according to the number $N_{HELTF}$ of OFDM symbols
(Continued)

and the determined HE-LTF sequence in frequency domain. In the foregoing solution, a PAPR value is relatively low.

12 Claims, 11 Drawing Sheets

Related U.S. Application Data continuation of application No. 15/987,216, filed on May 23, 2018, now Pat. No. 10,686,640, which is a continuation of application No. PCT/CN2016/106941, filed on Nov. 23, 2016.

(51) Int. Cl.
| | | |
|---|---|---|
| *H04W 84/12* | (2009.01) | |
| *H04L 25/02* | (2006.01) | |
| *H04W 72/23* | (2023.01) | |
| *H04W 24/10* | (2009.01) | |
| *H04W 72/1268* | (2023.01) | |
| *H04B 7/0452* | (2017.01) | |

(52) U.S. Cl.
CPC ........ *H04L 27/261* (2013.01); *H04L 27/2614* (2013.01); *H04W 24/10* (2013.01); *H04W 72/1268* (2013.01); *H04W 72/23* (2023.01); *H04W 84/12* (2013.01); *H04B 7/0452* (2013.01); *H04L 27/2601* (2013.01)

(56) References Cited

U.S. PATENT DOCUMENTS

| | | | |
|---|---|---|---|
| 8,989,102 | B2 | 3/2015 | Kenney et al. |
| 9,825,796 | B2 | 11/2017 | Porat et al. |
| 9,923,680 | B2 | 3/2018 | Porat et al. |
| 10,135,590 | B2 | 11/2018 | Park et al. |
| 10,159,043 | B1 | 12/2018 | Cao et al. |
| 10,447,448 | B2 | 10/2019 | Park et al. |
| 2008/0095274 | A1 | 4/2008 | Becker et al. |
| 2008/0123616 | A1 | 5/2008 | Lee |
| 2008/0317149 | A1 | 12/2008 | Sondur et al. |
| 2009/0181687 | A1 | 7/2009 | Tirola et al. |
| 2010/0254368 | A1 | 10/2010 | Tomoya |
| 2011/0013607 | A1 | 1/2011 | Van Nee et al. |
| 2011/0013721 | A1 | 1/2011 | Yen-Chin et al. |
| 2011/0194544 | A1 | 8/2011 | Yang et al. |
| 2011/0299382 | A1 | 12/2011 | Van Nee et al. |
| 2012/0127940 | A1 | 5/2012 | Lee et al. |
| 2012/0201316 | A1 | 8/2012 | Zhang et al. |
| 2012/0267142 | A1 | 10/2012 | Nordin et al. |
| 2012/0327871 | A1 | 12/2012 | Ghosh et al. |
| 2013/0021568 | A1 | 1/2013 | Hsieh et al. |
| 2013/0070747 | A1 | 3/2013 | Gardner et al. |
| 2013/0107893 | A1 | 5/2013 | Zhang |
| 2013/0242963 | A1 | 9/2013 | Van Nee et al. |
| 2013/0272198 | A1 | 10/2013 | Azizi et al. |
| 2013/0286959 | A1 | 10/2013 | Lou et al. |
| 2014/0079041 | A1 | 3/2014 | Lopez et al. |
| 2014/0169245 | A1 | 6/2014 | Kenney et al. |
| 2014/0307612 | A1 | 10/2014 | Sameer et al. |
| 2015/0023272 | A1 | 1/2015 | Choi et al. |
| 2015/0023335 | A1 | 1/2015 | Vermani et al. |
| 2015/0063288 | A1 | 3/2015 | Yang et al. |
| 2015/0319027 | A1 | 11/2015 | Tang et al. |
| 2015/0381399 | A1 | 12/2015 | Nasrabadi et al. |
| 2016/0007325 | A1 | 1/2016 | Seok |
| 2016/0029373 | A1 | 1/2016 | Seok |
| 2016/0127948 | A1 | 5/2016 | Azizi et al. |
| 2016/0198358 | A1 | 7/2016 | Rong et al. |
| 2016/0204912 | A1 | 7/2016 | Sun et al. |
| 2016/0255179 | A1 | 9/2016 | Kim |
| 2016/0286551 | A1 | 9/2016 | Lee et al. |
| 2016/0301451 | A1 | 10/2016 | Yongho et al. |
| 2016/0323848 | A1 | 11/2016 | Azizi et al. |
| 2016/0330006 | A1 | 11/2016 | Zhang et al. |
| 2016/0360507 | A1 | 12/2016 | Cariou et al. |
| 2017/0013607 | A1 | 1/2017 | Cariou et al. |
| 2017/0033914 | A1 | 2/2017 | Park et al. |
| 2017/0041825 | A1 | 2/2017 | Yang et al. |
| 2017/0048882 | A1 | 2/2017 | Li et al. |
| 2017/0222769 | A1 | 8/2017 | Li et al. |
| 2017/0302343 | A1 | 10/2017 | Choi et al. |
| 2017/0303279 | A1 | 10/2017 | Park et al. |
| 2017/0303280 | A1 | 10/2017 | Chun et al. |
| 2018/0020460 | A1 | 1/2018 | Hedayat |
| 2018/0027514 | A1 | 1/2018 | Chen et al. |
| 2018/0167929 | A9 | 6/2018 | Chu et al. |
| 2018/0184408 | A1 | 6/2018 | Xue et al. |
| 2018/0263047 | A1 | 9/2018 | Kim et al. |
| 2018/0288743 | A1 | 10/2018 | Choi et al. |
| 2018/0310330 | A1 | 10/2018 | Chun et al. |
| 2019/0021106 | A1 | 1/2019 | Oteri et al. |
| 2019/0058569 | A1 | 2/2019 | Seok |
| 2019/0165883 | A1 | 5/2019 | Chun et al. |
| 2019/0215813 | A1 | 7/2019 | Xue et al. |
| 2019/0268805 | A1 | 8/2019 | Lee et al. |
| 2021/0385830 | A1* | 12/2021 | Lim .................. H04L 27/2613 |

FOREIGN PATENT DOCUMENTS

| | | |
|---|---|---|
| CN | 101924721 A | 12/2010 |
| CN | 101958739 A | 1/2011 |
| CN | 102469053 A | 5/2012 |
| CN | 102474488 A | 5/2012 |
| CN | 102761390 A | 10/2012 |
| CN | 102823212 A | 12/2012 |
| CN | 102826212 A | 12/2012 |
| CN | 103444114 A | 12/2013 |
| CN | 103999392 A | 8/2014 |
| CN | 104067586 A | 9/2014 |
| CN | 104378149 A | 2/2015 |
| CN | 104580053 A | 4/2015 |
| CN | 104735015 A | 6/2015 |
| CN | 105119851 A | 12/2015 |
| CN | 106487737 A | 3/2017 |
| CN | 108551434 A | 9/2018 |
| EP | 2810417 A1 | 12/2014 |
| JP | 2012533931 A | 12/2012 |
| JP | 2013526139 A | 6/2013 |
| JP | 2017505027 A | 2/2017 |
| KR | 20120049885 A | 5/2012 |
| KR | 20130008060 A | 1/2013 |
| RU | 2528008 C2 | 9/2014 |
| WO | 2012062123 A1 | 5/2012 |
| WO | 2013122377 A1 | 8/2013 |
| WO | 2014193547 A1 | 12/2014 |
| WO | 2016070330 A1 | 5/2016 |
| WO | 2017020283 A1 | 2/2017 |

OTHER PUBLICATIONS

Sungho Moon (Newracom): "Considerationson LTF Sequence Design; 11-15-0584-00-00ax-considerations-on-tfsequence-design", IEEE 802.11-15/0584r0, May 2015, pp. 1-14, XP068094444.
Le Liu (Huawei): "HE-LTF Sequence Design; 11-15-1334-00-00ax-he-ltf-sequence-design", IEEE 802.11-15/1334r0, Nov. 2015. total 38 pages. XP68099297A.
Yongho Seok, Newracom et al., "Beamformed HE PPDU," IEEE 802.11-15/0597r1, May 2015. total 13 pages.
Katsuo Yunoki(KDDI RandD Laboratories) et al. DL MU Signalling, IEEE 802.11-15/1031r0, Sep. 2015, total 11 pages.
Bo Sun (ZTE Corp.)."IEEE 802.11 Tgax," Nov. 2015 Bangkok PHY Ad Hoc Meeting Minutes, IEEE 802.11-15/1442r0, Jul. 2015. total 21 pages.
Hongyuan Zhang (Marvell) et al., "HE-LTF Proposal," IEEE 802.11-15/0349, Mar. 2015. total 43 pages.
S. Azizi, Intel, J. Choi, LGE:"OFDMA Numerology and Structure", IEEE 802.11/150330r5, May 2015, total 50 pages.
Robert Stacey(Intel):"Specification Framework for Tgax", IEEE P802.11 Wireless LANs, IEEE 802.11-15/0132r7, Jul. 2015, total 13 pages.

(56) References Cited

OTHER PUBLICATIONS

Jianhan Liu (Mediatek) et al. Channel Estimation Enhancement and Transmission Efficiency Improvement Using Beam-Change Indication and 1 x HE-LTF, IEEE 802.11-15/1322r0, Nov. 2015. total 35 pages.
Qinghua Li (Intel) et al., "HE-LTF Sequence for UL MU-MIMO," IEEE 802.11-15/0602r6, Sep. 2015, total 33 pages.
Daewon Lee (Newracom) et al., "LTF Design for Uplink MU-MIMO," IEEE 802.11-15/1088r0, Sep. 2015, total 28 pages.
Daewon Lee (Newracom) et al., "LTF Design for Uplink MU-MIMO," IEEE 802.11-15/0845r0, Jul. 2015, total 18 pages.
Yakun Sun (Marvell) et al., "P Matrix for HE-LTF," IEEE 802.11-15/0817r0, Jul. 2015, total 19 pages.
Sungho Moon (Newracom) et al. Considerations on LTF Sequence Design, IEEE 802.11-15/0584r1. May 2015. total 14 pages.
Robert Stacey, Specification Framework for Tgax. IEEE 802.11-15/0132r8, Sep. 2015, 22 pages.
Robert Stacey, "Specification Framework for Tgax," IEEE 802.11-15/0132r10, Nov. 2015, 34 pages.
Hanqing Lou et al., "Sub-Channel Selection for Multi-User Channel Access in Next Generation Wi-Fi," 2014 IEEE 25th Annual International Symposium on Personal, Indoor, and Mobile Radio Communication (PIMRC), 2014, pp. 779-784.
IEEE Std 802.11™—2012 IEEE Standard for Information technology—Telecommunications and information exchange between systems Local and metropolitan area networks—Specific requirements Part 11: Wireless LAN Medium Access Control (MAC) and Physical Layer (PHY) Specifications, IEEE Computer Society, Sponsored by the LAN/MAN Standards Committee, Mar. 29, 2012, 2793 pages.
U.S. Appl. No. 62/330,822, Eunsung Park et al. LG Electronics Inc. ,May 2, 2016. total 16 pages.
IEEE Std 802_ 11 ac™—2013,Part 11: Wireless LAN Medium Access Control (MAC) and Physical Layer (PHY) Specifications. IEEE Computer Society,dated Dec. 11, 2013, total 425 pages.
Hongyuan Zhang (Marvell), "HE-LTF Proposal; 11-15-0349-02-00ax-he-ltf-proposal," IEEE Draft; vol. 802.11 ax, No. 2, Mar. 10, 2015, pp. 1-43, XP068082992.
Kome Oteri (Interdigital):"Performance of 1x, 2x, and 4x HE-LTF;11-15-0569-01-00ax-performance-of-1 x-2x-and-4x-he-ltf", IEEE Draft; vol. 802.11 ax, No. 1, May 11, 2015, pp. 1-20, XP068094425.
Sungho Moon (Newracom):"LTF Sequence Designs; 11-15-1303-00-00ax-ltf-sequence-designs", IEEE Draft; vol. 802.11 ax, Nov. 9, 2015, pp. 1-25, XP068099246.
Le Liu et al., Remaining HE-LTF Sequence Design, IEEE 802.11-16/0052r0, Jan. 2016, total 30 pages.
Sungho Moon et al. LTF Sequence Designs;11-15-1303-00-00ax-ltf-sequence-designs, IEEE802.11-15-1303r0, Nov. 2015. total 25 pages.
Kim et al., "160MHz transmissions," IEEE802.11-10/0774r0, 11-10-0774-00-00ac-160-mhztransmissions, pp. 1-25, Institute of Electrical and Electronics Engineers, New York, New York (Jul. 2010).
Liu et al., HE-LTF Sequence Design, IEEE802.11-15/1334r1, 11-15-1334-01-00ax-he-ltf-sequencedesign, pp. 1-37, Institute of Electrical and Electronics Engineers, New York New York (Nov. 2015).
Oteri et al., "Performance of 1x, 2x, and 4x HE-LTF," doc. IEEE 802.11-15/569r0, total 18 pages (May 11, 2015).
IEEE, HE-LTF Sequence Design, Published Nov. 9, 2015, all pages (Year: 2015).
1. U.S. Appl. No. 16/870,570, filed May 8, 2020.
2. U.S. Appl. No. 15/987,216, filed May 23, 2018.
"IEEE Standard for Information technology—Telecommunications and information exchange between systems Local and metropolitan area networks—Specific requirements, Part 11: Wireless LAN Medium Access Control (MAC) and Physical Layer (PHY) Specifications Amendment 4: Enhancements for Very High Throughput for Operation in Bands below 6 GHz," IEEE Std 802.11ac™—2013, IEEE Computer Society, total 425 pages (2013).
"IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput," IEEE Std 802.11n™—2009, IEEE Computer Society, total 536 pages (2009).

\* cited by examiner

DATA TRANSMISSION METHOD AND APPARATUS IN WIRELESS LOCAL AREA NETWORK

CROSS-REFERENCE TO RELATED APPLICATIONS

This application is a continuation of U.S. patent application Ser. No. 16/870,570, filed on May 8, 2020 (now U.S. Pat. No. 10,999,119), which is a continuation of U.S. patent application Ser. No. 15/987,216, filed on May 23, 2018 (now U.S. Pat. No. 10,686,640), which is a continuation of International Application No. PCT/CN2016/106941, filed on Nov. 23, 2016. The International Application claims priority to Chinese Patent Application No. 201510854631.4, filed on Nov. 30, 2015, and claims priority to Chinese Patent Application No. 201510823977.8, filed on Nov. 23, 2015. All of the afore-mentioned patent applications are hereby incorporated by reference in their entireties.

TECHNICAL FIELD

The present disclosure relates to the communications field, and in particular, to a service message construction method and apparatus.

BACKGROUND

A wireless local area network (WLAN) is a data transmission system, and replaces, by using a radio frequency (RF) technology, a legacy local area network including a twisted-pair copper wire, so that a user can transmit information via the wireless local area network by using a simple access architecture. Development and application of a WLAN technology have greatly changed people's communication manner and working manner, and bring unprecedented convenience to people. Wide application of intelligent terminals is accompanied by people's growing requirements for data network traffic. Development of the WLAN depends on standard formulation, popularization, and application. The IEEE 802.11 family is primary standards, and mainly includes 802.11, 802.11b/g/a, 802.11n, and 802.11ac. In all standards except the 802.11 and the 802.11b, an orthogonal frequency division multiplexing (OFDM) technology is used as a core technology at a physical layer.

Channel estimation is a process of estimating, according to a receive signal and by a specific criterion, a parameter of a channel through which a transmit signal passes. Performance of a wireless communications system is affected by a wireless channel to a great extent, such as shadow fading and frequency selective fading. Consequently, a transmission path between a transmitter and a receiver is extremely complex. Unlike a wired channel that is fixed and predictable, the wireless channel is characterized by high randomness. A channel needs to be estimated in coherent detection of an OFDM system, and channel estimation precision directly affects performance of the entire system.

SUMMARY

To reduce a PAPR of a wireless local area network, the present embodiment provides an HE-LTF transmission method, including: determining, based on a total number of space-time streams, $N_{STS}$, a number of OFDM symbols of an HE-LTF field, $N_{HELTF}$; determining an HE-LTF sequence in frequency domain according to a transmission bandwidth and a mode of the HE-LTF field, where the HE-LTF sequence in frequency domain includes but is not limited to the HE-LTF sequence of 1× mode and that is mentioned in implementations; and sending a time-domain signal(s) according to the number $N_{HELTF}$ of OFDM symbols and the determined HE-LTF sequence in frequency domain.

In addition, correspondingly, an HE-LTF transmission method is provided, including: obtaining a transmission bandwidth BW, a total number of space-time streams, $N_{STS}$, and an mode of an HE-LTF field according to information carried in a signal field in a preamble; determining, based on the total number of space-time streams, $N_{STS}$, a number of OFDM symbols included in an HE-LTF field, $N_{HELTF}$; determining a corresponding HE-LTF sequence in frequency domain according to the transmission bandwidth and the HE-LTF field mode, where the HE-LTF sequence in frequency domain includes but is not limited to the HE-LTF sequence of 1× mode and that is mentioned in implementations; and obtaining a channel estimation value of a corresponding subcarrier location according to the received HE-LTF field and the determined sequence in frequency domain.

By means of simulation and comparison, the HE-LTF sequence of the 1× mode in the embodiment is used, so that a system has an extremely low PAPR value.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 6:
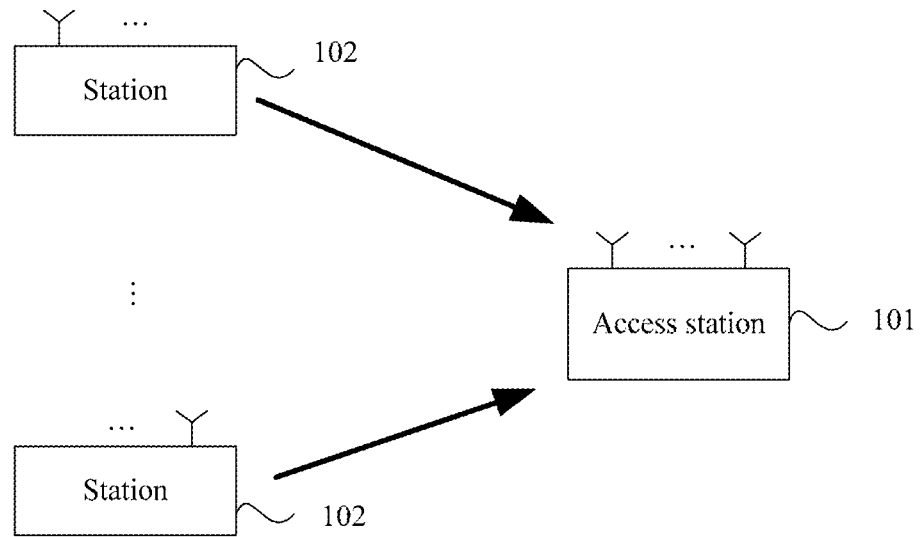
FIG. 6 is a simple schematic diagram of a system architecture in an embodiment.

Solutions of the embodiments of the present disclosure may be applicable to a WLAN network system. FIG. 6 is a schematic diagram of a scenario to which a pilot transmission method in a wireless local area network is applicable according to Embodiment 1 of the present disclosure. As shown in FIG. 6, the WLAN network system may include one access point 101 and at least two stations 102.

An access point (AP) may also be referred to as a wireless access point, a bridge, a hotspot, or the like, and may access a server or a communications network.

The station (STA) may also be referred to as user equipment, and may be a wireless sensor, a wireless communications terminal, or a mobile terminal, such as a mobile phone (or referred to as a "cellular" phone) that supports a Wi-Fi communication function and a computer with a wireless communication function. For example, the station may be a portable, pocket-sized, handheld, computer built-in, wearable, or in-vehicle wireless communications apparatus that supports a Wi-Fi communication function, which exchanges communication data such as a voice or data with a radio access network. A person skilled in the art learns that some communications devices may have functions of both the foregoing access point and the foregoing station, and no limitation is imposed herein.

Figure 1:
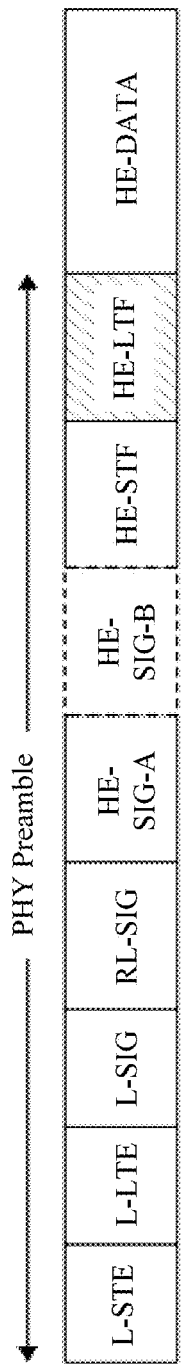
FIG. 1 is a simple schematic diagram of a format of an HE PPDU.
Figure 2:
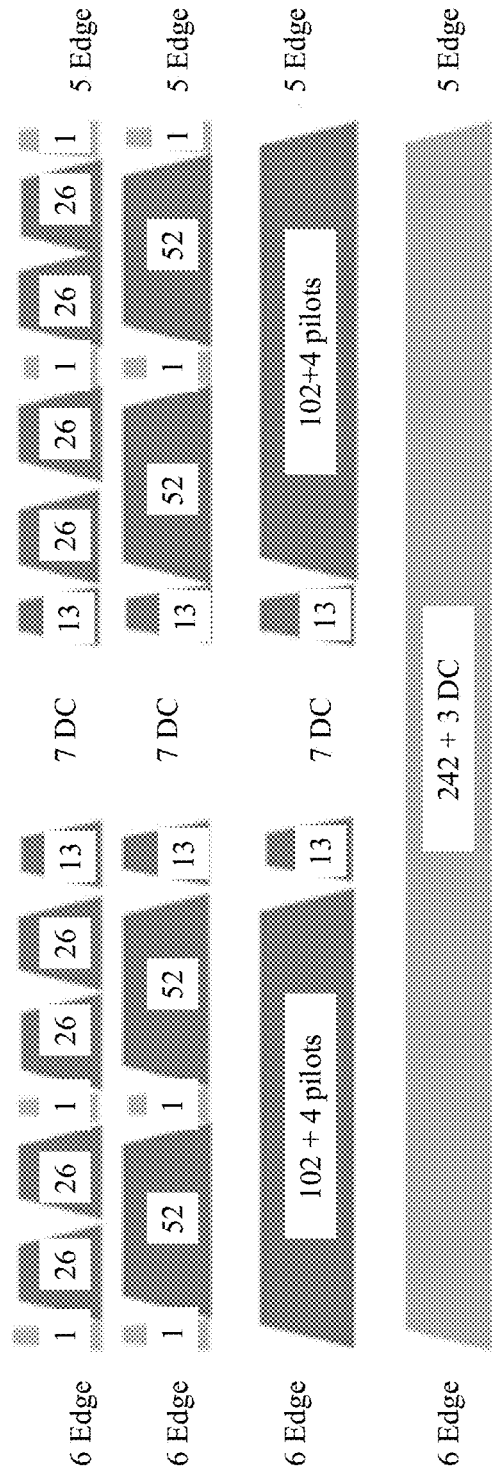
FIG. 2 is a schematic diagram of a tone plan in a 20 MHz bandwidth.
Figure 3A:
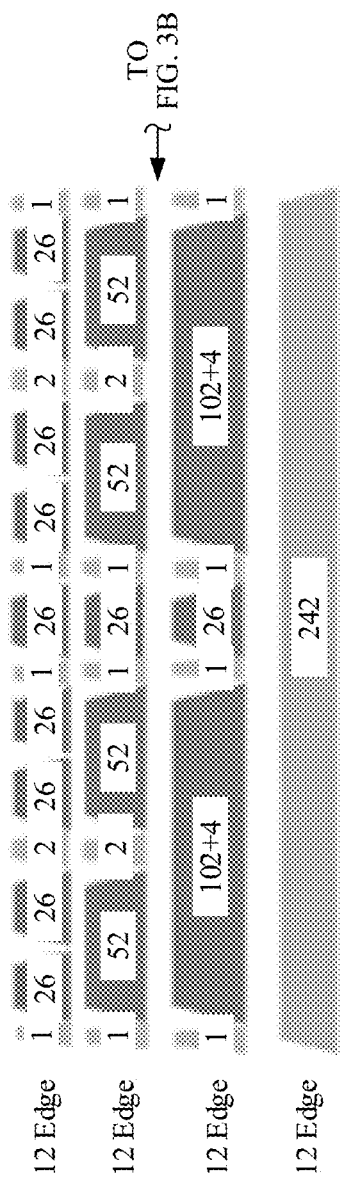
FIG. 3A and FIG. 3B are a schematic diagram of a tone plan in a 40 MHz bandwidth.
Figure 3B:
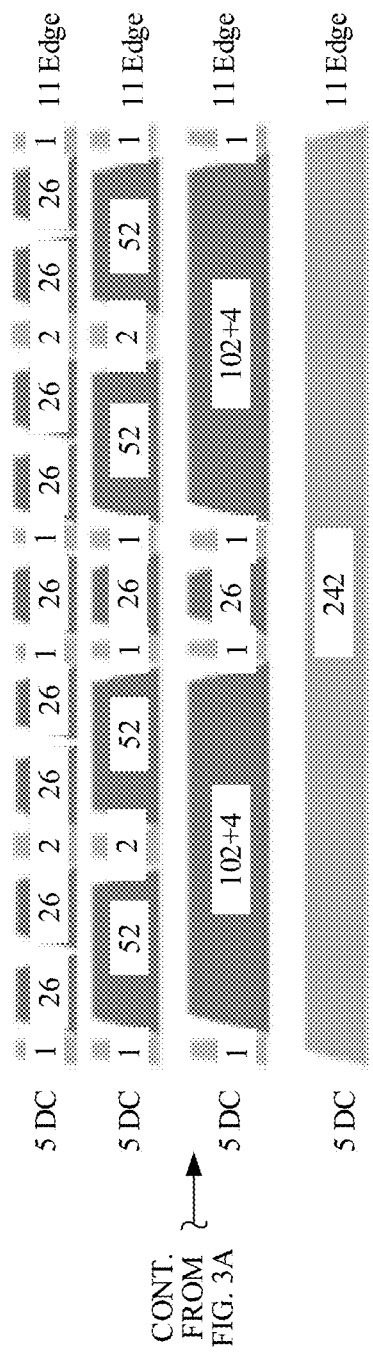
Figure 4A:
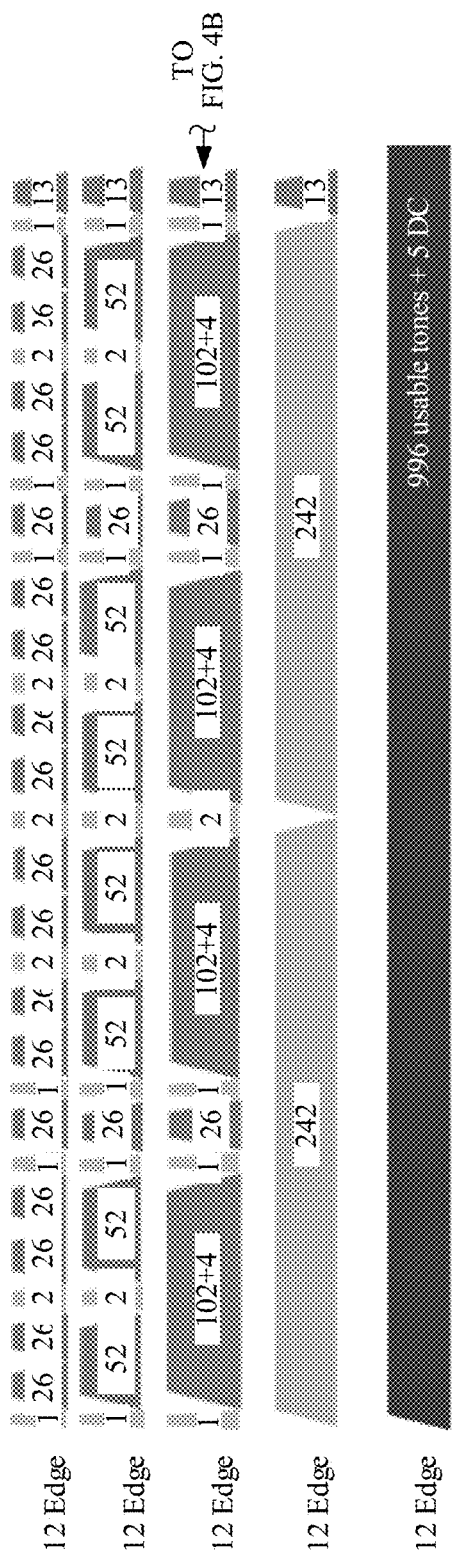
FIG. 4A and FIG. 4B are a schematic diagram of a tone plan over an 80 MHz bandwidth.
Figure 4B:
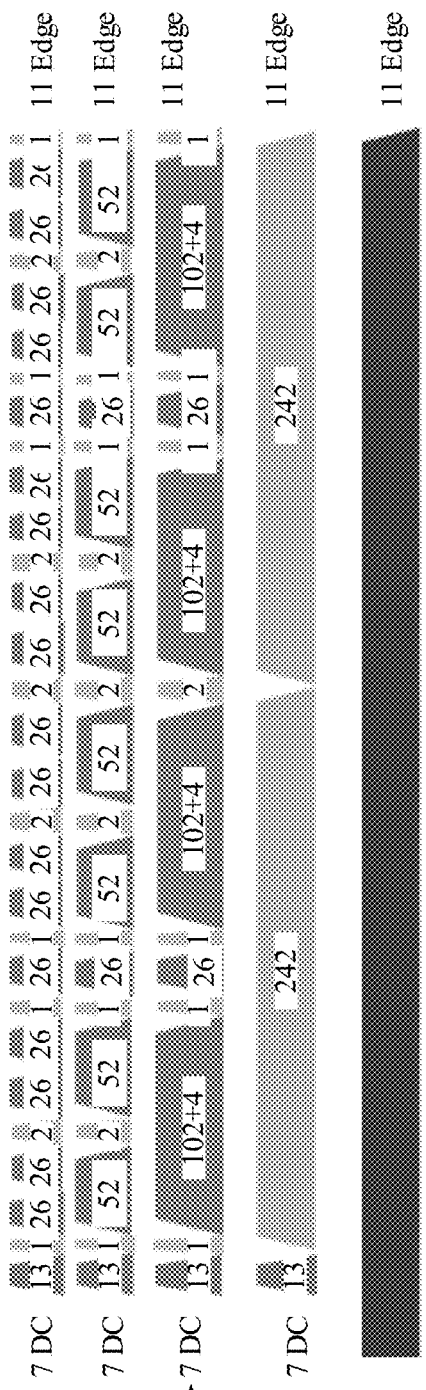

A common point of the foregoing WLAN standards that use an OFDM technology as a core is that a long training field (LTF) that can be used for channel estimation is stipulated at a physical layer. For example, FIG. 1 shows a format that is of a high efficiency (HE) physical protocol data unit (PPDU) and that is stipulated in the 802.11ax standard. An HE-LTF field is a high efficiency long training field used for channel estimation of a data part. This field may include one or more HE-LTF elements, and each element is an OFDM symbol.

To improve a system throughput rate, the OFDMA technology is introduced into the 802.11ax standard. A corresponding subcarrier spacing at a physical layer reduces from existing $\Delta_F^{1\times}=20$ MHz/64=312.5 kHz to $\Delta_F^{4\times}=20$ MHz/256=78.125 kHz, and a Fourier transform period of an OFDM symbol of a data part at the physical layer also changes from $T_{DFT}^{1\times}=1/\Delta_F^{1\times}=3.2$ us to $T_{DFT}^{4\times}=1/\Delta_F^{4\times}=12.8$us. Sometimes, the subcarrier spacing is changed to $\Delta_F^{2\times}=20$ MHz/128=156.25 kHz. Formats of the foregoing different OFDM symbols are respectively referred to as a 4× mode, a 2× mode, and a 1× mode for short.

As the 802.11ax standard gradually evolves, FIG. 2 to FIG. 4A and FIG. 4B show tone plans in a 20 MHz bandwidth, a 40 MHz bandwidth, an 80 MHz bandwidth, and a 160/80+80 MHz bandwidth. Tone plans in a left 80 MHz bandwidth and a right 80 MHz bandwidth of the 160/80+80 MHz are the same as a tone plan in the 80 MHz bandwidth. The tone plan shows a possible location and size of a resource unit during scheduling.

In the 20 MHz bandwidth, pilot subcarrier locations of 242 RUs (resource unit) are ±22, ±48, ±90, and ±116. In the 40 MHz bandwidth, pilot subcarrier locations of 484 RUs are ±10, ±36, ±78, ±104, ±144, ±170, ±212, and ±238. In the 80 MHz bandwidth, pilot subcarrier locations of 996 RUs are ±24, ±92, ±158, ±226, ±266, ±334, ±400, and ±468.

To further improve system efficiency in different scenarios, the HE-LTF field needs to support OFDM symbols in the foregoing 4× mode, 2× mode, and 1× mode.

Figure 5:
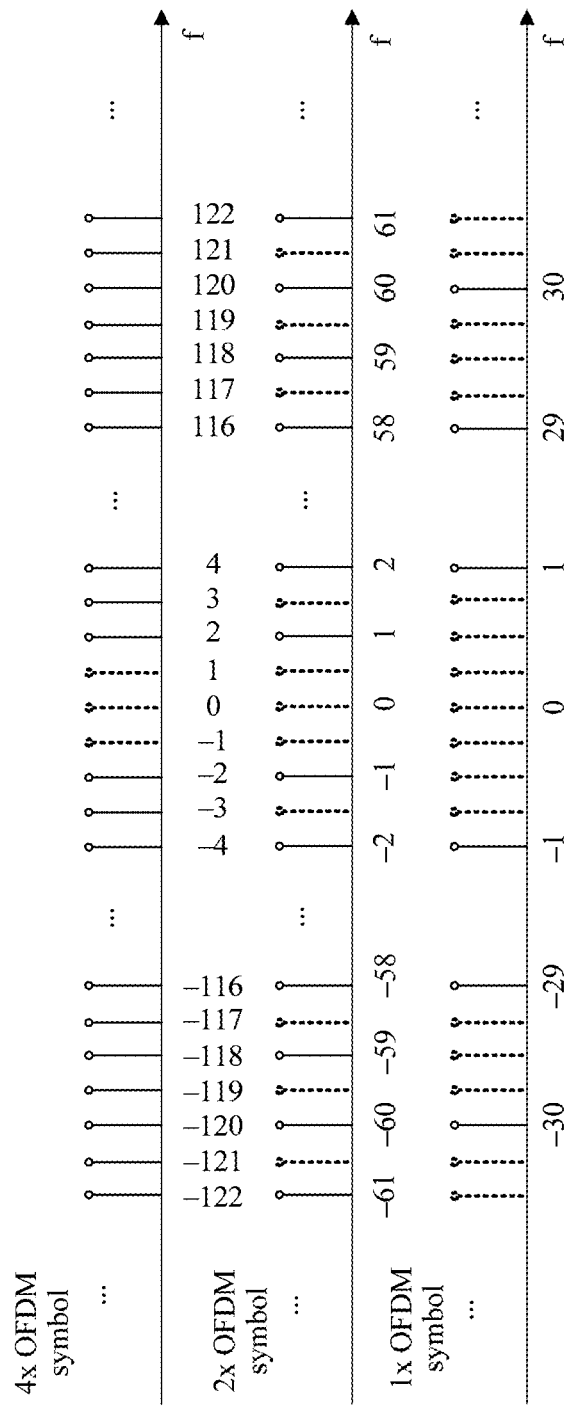
FIG. 5 is a schematic diagram of simple comparison of 1×, 2×, and 4×OFDM symbols in a frequency domain.

As shown in FIG. 5, a 20 MHz bandwidth is used as an example. When subcarrier locations are marked as −128, −127, . . . , −2, −1, 0, 1, 2, . . . , and 127, in a 4× mode, subcarriers in an HE-LTF element that carry a long training sequence are located in locations (indexes) −122, −121, . . . , −3, −2, 2, 3, . . . , 121, and 122, remaining subcarriers are empty subcarriers, and a subcarrier spacing is $\Delta_F^{4\times}=20$ MHz/256=78.125 kHz.

In a 2× mode, subcarriers in an HE-LTF element that carry a long training sequence are located in −122, −120, . . . , −4, −2, 2, 4, . . . , 120, and 122, and remaining subcarriers are empty subcarriers. Equivalently, subcarrier locations may be marked as −64, −63, . . . , −2, −1, 0, 1, 2, . . . , and 63. In this case, the subcarriers in the HE-LTF element in the 2× mode that carry a long training sequence are located in −61, −60, . . . , −2, −1, 1, 2, . . . , 60, and 61, and the remaining subcarriers are empty subcarriers. In this case, a subcarrier spacing is $\Delta_F^{2\times}=20$ MHz/128=156.25 kHz.

Similarly, in a 1× mode, subcarriers in an HE-LTF element that carry a long training sequence are located in −120, −116, . . . , −8, −4, 4, 8, . . . , 116, and 120, and remaining subcarriers are empty subcarriers. Equivalently, subcarrier locations may be marked as −32, −31, . . . , −2, −1, 0, 1, 2, . . . , and 31. In this case, in the 1× mode, the subcarriers in the HE-LTF element that carry a long training sequence are located in −30, −29, . . . , −2, −1, 1, 2, . . . , 29, and 30, and the remaining subcarriers are empty subcarriers. In this case, a subcarrier spacing is =20 MHz/64=312.5 kHz.

Currently, only a 4×HE-LTF sequence and a 2×HE-LTF sequence are determined, and a 1×HE-LTF sequence has not been determined. It is still open in terms of how to define the 1×HE-LTF sequence.

In the 11n standard and the 11ac standard, a subcarrier spacing is $\Delta_F^{1\times}$, and a 20 MHz HT/VHT LTF sequence is defined as follows:

BB_LTF_L={+1, +1, −1, −1, +1, +1, −1, +1, −1, +1, +1, +1, +1}

BB_LTF_R={+1, −1, −1, +1, +1, −1, +1, −1, +1, −1, −1, −1, −1}

LTF$_{left}$={BB_LTF_L, BB_LTF_L}={+1, +1, −1, −1, +1, +1, −1, +1, −1, +1, +1, +1, +1, +1, +1, −1, −1, +1, +1, −1, +1, −1, +1, +1, +1, +1}

LTF$_{right}$={BB_LTF_R, −1×BB_LTF_R}={+1, −1, −1, +1, +1, −1, +1, −1, +1, −1, −1, −1, −1, −1, +1, +1, −1, −1, +1, −1, +1, −1, +1, +1, +1, +1}

VHT-LTF$_{56}$(−28:28)={+1, +1, LTF$_{left}$, 0, LTF$_{right}$, −1, −1}

However, subcarriers in a 1×HE-LTF element that carry a long training sequence are located in 60 non-empty subcarriers in total: −30, −29, . . . , −2, −1, 1, 2, . . . , 29, and 30. LTF sequences in the existing 11n and 11ac standards cannot be directly used. A similar problem also exists in other bandwidths.

A 1×HE-LTF is mainly applied to an OFDM communication scenario rather than an OFDMA communication scenario. PAPR values of HE-LTF symbols generated when different RUs are scheduled do not need to be considered, and only a PAPR value of an HE-LTF symbol during OFDM transmission in each full bandwidth needs to be considered, for example, the 242 RU in 20 MHz, the 484 RU in 40 MHz, or the 996 RU in 80 MHz. Therefore, in the present embodiment, based on sequences BB_LTF_L, BB_LTF_R, $LTF_{left}$, and $LTF_{right}$ that are characterized by an excellent PAPR, a series of extension operations are performed on the sequences, to obtain new 1×HE-LTF sequences characterized by a low PAPR in different bandwidths. The following sequence $-1 \times BB\_LTF\_L$ indicates that polarity of each value in a sequence $BB\_LTF\_L$ is reversed, that is, 1 is changed to −1, and −1 is changed to 1. The same is true for $-1 \times BB\_LTF\_R$, $-1 \times LTF_{left}$, $-1 \times LTF_{right}$, and the like.

The present embodiment provides a method for sending an SU (single user) data packet or a DL-MU-MIMO (downlink multi-user multiple-input multiple-output) data packet by a transmit end, including a process of generating an HE-LTF field.

A number of OFDM symbols of an HE-LTF field, $N_{HELTF}$, is determined, on the basis of a total number of space-time streams, $N_{STS}$.

A HE-LTF sequence in frequency domain is determined according to a transmission bandwidth and a mode of the HE-LTF field. The HE-LTF sequence in frequency domain includes but is not limited to sequences mentioned in implementations.

Time-domain signals are sent according to the number of OFDM symbols $N_{HELTF}$ and the determined HE-LTF sequence in frequency domain.

Specifically, at a transmit end, the following steps are performed:

101. Determine, based on a total number of space-time streams, $N_{STS}$, a number of OFDM symbols of an HE-LTF field, $N_{HELTF}$. A specific correspondence is provided in the following Table 1.

TABLE 1

| $N_{STS}$ | $N_{HELTF}$ |
|---|---|
| 1 | 1 |
| 2 | 2 |
| 3 | 4 |
| 4 | 4 |
| 5 | 6 |
| 6 | 6 |
| 7 | 8 |
| 8 | 8 |

102. Determine a HE-LTF sequence in frequency domain according to a transmission bandwidth and an mode of the HE-LTF field. For example, when the transmission bandwidth is BW=20 MHz, and the mode of the HE-LTF field is a 1× mode, the HE-LTF sequence in frequency domain is correspondingly an HE-LTF sequence in Embodiment 1.

Figure 7:
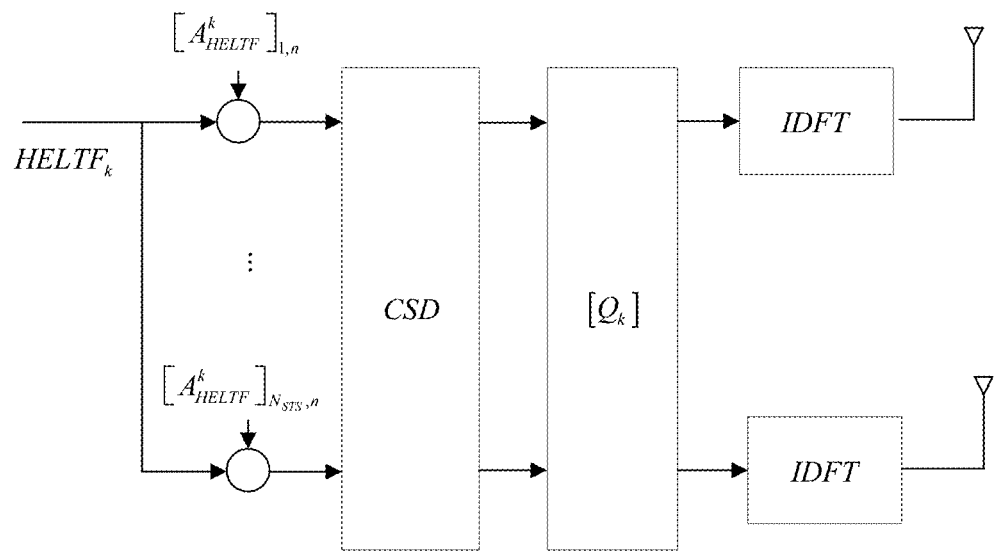
FIG. 7 is a simple schematic diagram of generating and sending an HE-LTF field during sending of an SU or a downlink DL MU MIMO data packet.

103. If $N_{HELTF} > 1$, determine that a used orthogonal mapping matrix A includes $N_{HELTF}$ rows and $N_{HELTF}$ columns. Specially, when $N_{HELTF}=1$, the orthogonal mapping matrix A is degenerated into 1. A value of a sequence carried by a subcarrier of each OFDM symbol in the HE-LTF field is multiplied by the orthogonal mapping matrix A in the following manner. As shown in FIG. 7, when the number of space-time streams is $N_{STS}$, a value of a sequence carried by a $k^{th}$ subcarrier of an $n^{th}$ OFDM symbol of an $i^{th}$ spatial stream in the HE-LTF field is multiplied by $[A_{HELTF}^k]_{i,n}$, where $i=1, \ldots N_{STS}$, $n=1, \ldots N_{HELTF}$.

The orthogonal mapping matrix A is defined as follows:

$$A_{HELTF}^k = \begin{cases} R, & \text{if } k \in K_{Pilot} \\ P, & \text{otherwise} \end{cases},$$

where $K_{Pilot}$ is a pilot subcarrier set, a matrix P is defined as $$P = \begin{cases} P_{4\times 4}, N_{STS} \leq 4 \\ P_{6\times 6}, N_{STS} = 5, 6 \\ P_{8\times 8}, N_{STS} = 7, 8 \end{cases}$$

$w = \exp(-j2\pi/6)$, $$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}$$

$$P_{8\times 8} = \begin{bmatrix} P_{4\times 4} & P_{4\times 4} \\ P_{4\times 4} & -P_{4\times 4} \end{bmatrix},$$

and a matrix R is defined as $[R]_{m,n} = [P]_{l,n}$.

104. Perform different cyclic shift delay on each space-time stream in the HE-LTF field. A cyclic shift value corresponding to each space-time stream is shown in the following Table 2.

TABLE 2

$T_{CS}$ values for the VHT modulated fields of a PPDU

| Total number of space-time streams | Cyclic shift for space-time stream i (us) | | | | | | | |
|---|---|---|---|---|---|---|---|---|
| ($N_{STS}$) | 1 | 2 | 3 | 4 | 5 | 6 | 7 | 8 |
| 1 | 0 | — | — | — | — | — | — | — |
| 2 | 0 | −400 | — | — | — | — | — | — |
| 3 | 0 | −400 | −200 | — | — | — | — | — |
| 4 | 0 | −400 | −200 | −600 | — | — | — | — |
| 5 | 0 | −400 | −200 | −600 | −350 | — | — | — |
| 6 | 0 | −400 | −200 | −600 | −350 | −650 | — | — |
| 7 | 0 | −400 | −200 | −600 | −350 | −650 | −100 | — |
| 8 | 0 | −400 | −200 | −600 | −350 | −650 | −100 | −750 |

105. Map the space-time stream(s) in the HE-LTF field to transmit chain(s). If a total number of transmit chains is $N_{TX}$, and the total number of space-time streams is $N_{STS}$, an antenna mapping matrix $Q_k$ of a $k^{th}$ subcarrier includes $N_{TX}$ rows and $N_{STS}$ columns. The matrix $Q_k$ may be a matrix defined in chapter 20.3.11.11.2 in the 802.11n standard.

106. Obtain time-domain signal(s) of the HE-LTF field by means of inverse discrete Fourier transform, and send the time-domain signal (3).

At a receive end, the following steps are performed:

201. Obtain a transmission bandwidth BW, a total number of space-time streams, $N_{STS}$, and a mode of an HE-LTF field, according to information carried in a signal field in a preamble. The HE-LTF field mode is also referred to as an HE-LTF symbol mode, that is, the foregoing 1× mode, 2× mode, or 4× mode.

202. Determine, based on the total number of space-time streams, $N_{STS}$, a number of OFDM symbols of the HE-LTF field, $N_{HELTF}$.

203. Determine a corresponding HE-LTF sequence in frequency domain according to the transmission bandwidth and the mode of the HE-LTF field; and obtain a channel estimation value of a corresponding subcarrier location, based on the received HE-LTF field and the determined HE-LTF sequence in frequency domain.

In another example, there is a difference between a manner of generating the HE-LTF field during sending a UL-MU-MIMO (uplink multi-user multiple-input multiple-output) data packet, and a manner of generating an HE-LTF field during sending an SU data packet or a DL-MU-MIMO data packet; the difference lies in that: before a non-AP station sends the UL-MU-MIMO data packet, an AP needs to indicate uplink scheduling information by using a trigger frame, and the uplink scheduling information includes identifiers of scheduled stations, a transmission bandwidth, a total number of space-time streams (or a number of HE-LTF symbols), and a sequence number of a spatial stream allocated to the scheduled stations.

At a transmit end, the following steps are performed:

301. Determine, a number of OFDM symbols of an HE-LTF field, $N_{HELTF}$, based on a total number of space-time streams, $N_{STS}$. If the scheduling information includes information of the number of HE-LTF symbols, this step may be omitted.

302. Determine a HE-LTF sequence in frequency domain according to a transmission bandwidth and a mode of the HE-LTF field. For example, when the transmission bandwidth is BW=40 MHz, and the mode of the HE-LTF field is a 1× mode, the HE-LTF sequence in frequency domain is correspondingly an HE-LTF sequence in the following Embodiment 2.

303. Perform masking (that is, exclusive OR) processing on the HE-LTF sequence by using a row sequence corresponding to a sequence number of a spatial stream allocated to the transmit end (that is, a scheduled user) in an 8×8 matrix P. For example, when an initial HE-LTF sequence is $\{L_1, L_2, \ldots, L_m\}$, and the sequence number of the spatial stream allocated to the transmit end is $\{i_1, i_2, i_3\}$, an $\{i_1, i_2, i_3\}^{th}$ row in the 8×8 matrix P is selected for a mask sequence. In this case, a masked HE-LTF sequence of an $i_1^{th}$ spatial stream is:

$HELTF_k^{j1} = \{L_1P_{i_1,1}, L_2P_{i_1,2}, \ldots, L_8P_{i_1,8}L_9P_{i_1,1}, L_{10}P_{i_1,2}, \ldots, L_{16}P_{i_1,8}, L_{17}P_{i_1,1}, \ldots, L_mP_{i_1,((m-1)mod8)+1}\}$, where mod indicates a modulo operation. Likewise, $HELTF_k^{i2}$ and $HELTF_k^{i3}$ may be obtained.

304. Determine that a used orthogonal mapping matrix A includes $N_{HELTF}$ rows and $N_{HELTF}$ columns. A value of a sequence carried by a subcarrier of each OFDM symbol in the HE-LTF field is multiplied by the orthogonal mapping matrix A in the following manner.

Figure 8:
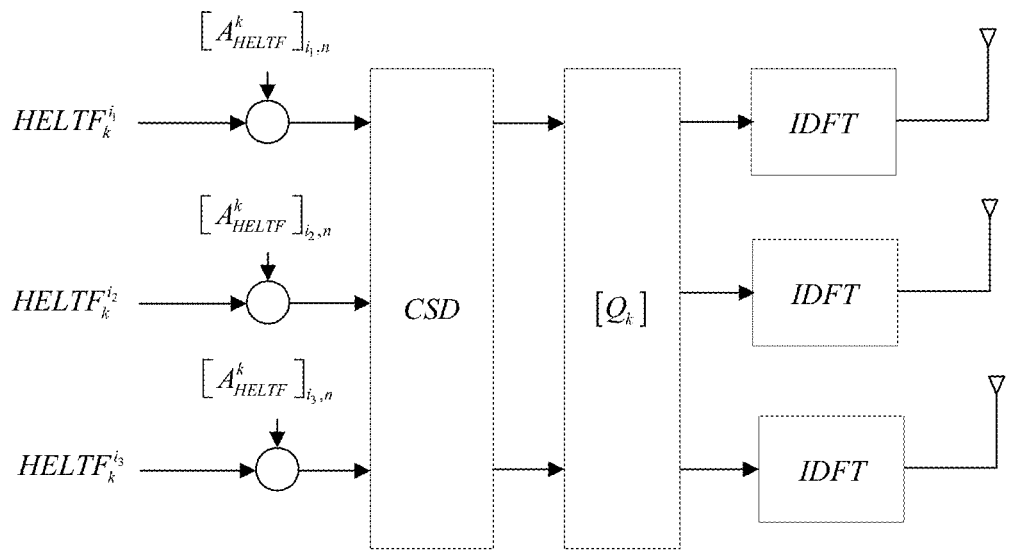
FIG. 8 is a simple schematic diagram of generating and sending an HE-LTF field during sending of a UL MU MIMO data packet.

For example, as shown in FIG. 8, when the sequence number of the spatial stream allocated to the transmit end (that is, the scheduled user) is $\{i_1, i_2, i_3\}$, a value $HELTF_k^i$ of a sequence carried by a $k^{th}$ subcarrier of an $n^{th}$ OFDM symbol in the HE-LTF field is multiplied by $[A_{HELTF}^k]_{i,n}$, where $i=i_1, i_2, i_3$, and $n=1, \ldots N_{HELTF}$. Optionally, the matrix A in FIG. 7 may be replaced with a matrix P.

Remaining steps are similar to those in the foregoing example, and details are not described herein.

At a receive end, since it's a UL-MU-MIMO transmission and an AP knows related scheduling information, a channel estimation algorithm may be directly performed.

401. Obtain a channel estimation value of a corresponding subcarrier location, based on a received HE-LTF field and a known frequency domain sequence.

It can be understood that a CSD value, the matrix Q, and the like in the foregoing example are only examples, and other values may be selected. This is not limited in the embodiment.

Preferable HE-LTF sequences in a 1× mode in various bandwidths are described below by using examples.

Embodiment 1

Scenario: a subcarrier location A of a 1×HE-LTF in a 20 MHz bandwidth.

For example, additional eight subcarrier values are added based on two sequences BB_LTF_L and two sequences BB_LTF_R, so as to generate a 1×HE-LTF sequence. To ensure simple implementation, the eight subcarrier values are selected from 11, −11.

An optimal sequence is: HE-LTF$_{60}$(−120:4:120)= {BB_LTF_L, +1, −1, −1×BB_LTF_L, −1, −1, 0, +1, +1, BB_LTF_R, −1, −1, BB_LTF_R}, or may be represented as HE-LTF60(−120:4:120)={+1, +1, −1, −1, +1, +1, −1, +1, −1, +1, +1, +1, +1, −1, −1, −1, +1, +1, −1, −1, +1, −1, +1, −1, −1, −1, −1, −1, −1, 0, +1, +1, +1, −1, −1, +1, +1, −1, +1, −1, +1, −1, −1, −1, −1, −1, +1, −1, −1, +1, +1, −1, +1, −1, +1, −1, +1, −1, −1, −1, −1}. In addition, the sequence also includes a sequence obtained after polarity of each value in the sequence is reversed (that is, +1 is changed to −1, −1 is changed to +1, and 0 remains unchanged), and remaining subcarriers are 0, that is, empty subcarriers. Herein, as described above, −120:4:120 represents −120, −116, . . . , −8, −4, 0, 4, 8, . . . , 116, and 120. In this case, corresponding pilot subcarrier locations are ±48 and ±116, that is, there are four pilot subcarriers.

In a case of a single spatial stream, a PAPR value of a 1×HE-LTF symbol generated according to the sequence is only 4.1121 dB.

Referring to Table 3, a PAPR value caused by an inter-stream phase difference between a data subcarrier and a pilot subcarrier in a case of multiple spatial streams is listed in Table 3. The phase difference is caused by a matrix A, and the matrix A is defined in chapter 22.3.8.3.5 in the 11ac standard. Caused PAPR flapping is only 0.2586 dB, and a maximum PAPR value is 4.2136. Both a PAPR value of an existing 4×HE-LTF symbol and a PAPR value of an existing 2×HE-LTF symbol are greater than 5 dB in the 20 MHz bandwidth.

TABLE 3

| Phase Difference | 20 MHz |
| --- | --- |
| 1 | 4.1121 |
| −1 | 3.9572 |
| exp(−jπ/3) | 4.2136 |
| exp(−j2π/3) | 3.9550 |
| PAPR$_{max}$ − PAPR$_{min}$ | 0.2586 |

A suboptimal sequence is: HE-LTF$_{60}$(−120:4:120)={+1, −1, −1, BB_LTF_L, −1, BB_LTF_L, 0, BB_LTF_R, −1, −1×BB_LTF_R, +1, +1, −1}, or may be represented as HE-LTF$_{60}$(−120:4:120)={+1, −1, −1, +1, +1, −1, −1, +1, +1, −1, +1, −1, +1, +1, +1, +1, −1, +1, +1, −1, −1, +1, +1, −1, +1, −1, +1, +1, +1, +1, 0, +1, −1, −1, +1, +1, −1, +1, −1, +1, −1, −1, −1, −1, −1, −1, +1, +1, −1, −1, +1, −1, +1, −1, +1, +1, +1, +1, +1, −1}. In addition, the sequence also includes a sequence obtained after polarity of each value in the sequence is reversed (that is, +1 is changed to −1, −1 is changed to +1, and 0 remains unchanged), and remaining subcarriers are 0.

In a case of a single spatial stream, a PAPR value of a 1×HE-LTF symbol generated according to the sequence is only 4.0821 dB.

Referring to Table 4, a PAPR value caused by an inter-stream phase difference between a data subcarrier and a pilot subcarrier in a case of multiple spatial streams is listed in Table 4. The phase difference is caused by a matrix A, and the matrix A is defined in chapter 22.3.8.3.5 in the 11ac standard. PAPR flapping caused by the inter-stream phase difference between a data subcarrier and a pilot subcarrier in the case of multiple spatial streams is 0.2398 dB, and a maximum PAPR value is 4.3219 dB.

TABLE 4

| Phase Difference | 20 MHz |
| --- | --- |
| 1 | 4.0821 |
| −1 | 4.2189 |
| exp(−jπ/3) | 4.3219 |
| exp(−j2π/3) | 4.1652 |
| $PAPR_{max} - PAPR_{min}$ | 0.2398 |

Embodiment 2

Scenario: A Subcarrier Location B of a 1×HE-LTF in a 20 MHz Bandwidth.

For ease of an interpolation operation in channel estimation, another subcarrier location pattern of an HE-LTF in a 1× mode in the 20 MHz bandwidth is −122:4:122. For example, additional ten subcarrier values are added based on sequences BB_LTF_L, BB_LTF_R, $LTF_{left}$, and $LTF_{right}$, to generate a 1×HE-LTF sequence. To ensure simple implementation, the ten subcarrier values are selected from {1, −1}. An optimal sequence is: $HE-LTF_{62}$(−122:4:122)= {$LTF_{right}$, −1, +1, −1, −1, +1, −1, −1, −1, +1, +1, $LTF_{left}$}, or may be represented as $HE-LTF_{62}$(−122:4:122)={+1, −1, −1, +1, +1, −1, +1, −1, +1, −1, −1, −1, −1, −1, +1, +1, −1, −1, +1, −1, +1, −1, +1, +1, +1, +1, −1, +1, −1, −1, +1, −1, −1, −1, +1, +1, +1, +1, +1, −1, −1, +1, +1, −1, +1, −1, +1, +1, +1, −1, −1, +1, +1, +1, −1, −1, +1, +1, −1, +1, −1, +1, +1, +1, +1}. In addition, the sequence also includes a sequence obtained after polarity of each value in the sequence is reversed (that is, +1 is changed to +1, −1 is changed to +1, and 0 remains unchanged), and remaining subcarriers are 0, that is, empty subcarriers. Herein, as described above, −122:4:122 represents −122, −118, . . . , −6, −2, 2, 6, . . . , 118, and 122. In this case, corresponding pilot subcarrier locations are ±22 and ±90, that is, there are four pilot subcarriers.

In a case of a single spatial stream, a PAPR value of a 1×HE-LTF symbol generated according to the sequence is only 3.7071 dB.

Referring to Table 5, a PAPR value caused by an inter-stream phase difference between a data subcarrier and a pilot subcarrier in a case of multiple spatial streams is listed in Table 5. The phase difference is caused by a matrix A, and the matrix A is defined in chapter 22.3.8.3.5 in the 11ac standard. PAPR flapping caused by an inter-stream phase difference (caused by a matrix P, where the matrix P is defined in chapter 22.3.8.3.5 in the 11ac standard) between a data subcarrier and a pilot subcarrier in the case of multiple spatial streams is only 0.2657, and a maximum PAPR value is 3.9728. Both a PAPR value of an existing 4×HE-LTF symbol and a PAPR value of an existing 2×HE-LTF symbol are greater than 5 dB in the 20 MHz bandwidth.

TABLE 5

| Phase Difference | 20 MHz |
| --- | --- |
| 1 | 3.7071 |
| −1 | 3.9149 |
| exp(−jπ/3) | 3.9728 |
| exp(−j2π/3) | 3.8403 |
| PAPRmax−PAPRmin | 0.2657 |

A suboptimal sequence is: $HE-LTF_{62}$(−122:4:122)= {BB_LTF_L, +1, +1, −1, −1×BB_LTF_L, −1, −1, +1, −1, −1×BB_LTF_R, +1, −1, −1, −1×BB_LTF_R}, or may be represented as $HE-LTF_{62}$(−122:4:122)={+1, +1, −1, −1, +1, +1, −1, +1, −1, +1, +1, +1, +1, +1, +1, −1, −1, −1, +1, +1, −1, −1, +1, −1, +1, −1, −1, −1, −1, −1, −1, +1, −1, −1, +1, +1, −1, −1, +1, −1, +1, −1, +1, +1, +1, +1, +1, −1, −1, −1, +1, +1, −1, −1, +1, −1, +1, −1, +1, +1, +1, +1}. In addition, the sequence also includes a sequence obtained after polarity of each value in the sequence is reversed (that is, +1 is changed to −1, −1 is changed to +1, and 0 remains unchanged), and remaining subcarriers are 0.

In a case of a single spatial stream, a PAPR value of a 1×HE-LTF symbol generated according to the sequence is only 3.8497 dB.

Referring to Table 6, a PAPR value caused by an inter-stream phase difference between a data subcarrier and a pilot subcarrier in a case of multiple spatial streams is listed in Table 6. PAPR flapping caused by the inter-stream phase difference between a data subcarrier and a pilot subcarrier in the case of multiple spatial streams is 0.4069, and a maximum PAPR value is 4.2566 dB.

TABLE 6

| Phase Difference | 20 MHz |
| --- | --- |
| 1 | 3.8497 |
| −1 | 4.2566 |
| exp(−jπ/3) | 4.1794 |
| exp(−j2π/3) | 4.1750 |
| PAPRmax−PAPRmin | 0.4069 |

Figure 9A:
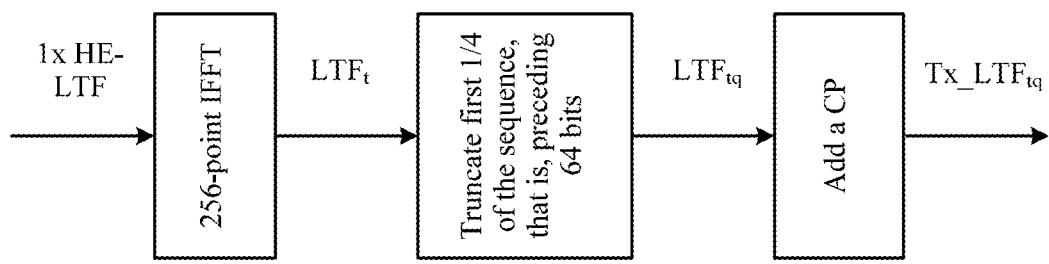
FIG. 9A, FIG. 9B, and FIG. 9C are block diagrams of a transmit end of a data transmission apparatus on a subcarrier location B of a 20 M 1×HE-LTF in an embodiment.

It should be noted that for Embodiment 2, in the subcarrier location B scenario of the HE-LTF in the 1× mode in the 20 MHz bandwidth, a time domain sequence obtained after an IFFT operation is performed on the 1×HE-LTF sequence is $LTF_t$={$LTF_{tq}$, −1×$LTF_{tq}$, $LTF_{tq}$, −1×$LTF_{tq}$}, where $LTF_{tq}$ is first ¼ of the time domain sequence. A transmit end may directly send an $LTF_{tq}$ sequence Tx_$LTF_{tq}$ to which a cyclic prefix (CP, or referred to as GI) is added. It should be noted that the CP sequence is a CP sequence obtained relative to an original sequence (that is, the sequence $LTF_t$) that exists before truncation. If the transmit end uses 256-point IFFT, reference may be made to FIG. 9A. FIG. 9A is a simple schematic diagram of a transmit end on a subcarrier location B of a 20 M 1×HE-LTF. Finally, a time windowing operation and sending are performed.

Figure 9B:
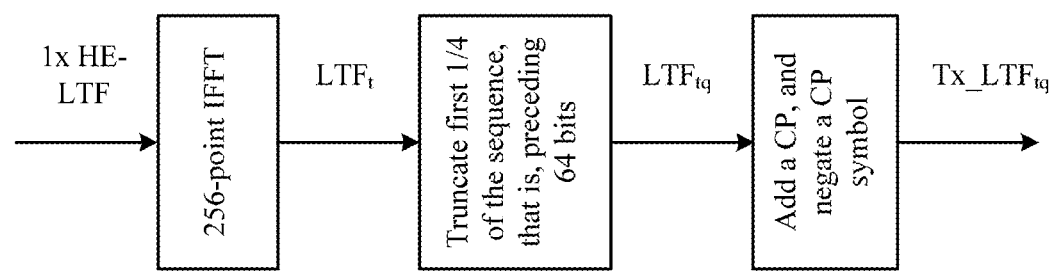

In another equivalent solution, the transmit end may perform an IFFT operation on the 1×HE-LTF sequence to obtain a time domain sequence that is $LTF_t$={$LTF_{tq}$, −1×$LTF_{tq}$, $LTF_{tq}$, −1×$LTF_{tq}$}, where $LTF_{tq}$ is first ¼ of the time domain sequence. Then, the first ¼ is truncated to obtain the sequence $LTF_{tq}$, and a CP of the $LTF_{tq}$ is obtained for the sequence $LTF_{tq}$ obtained by means of truncation. Then, after symbols of the CP sequence are negated (that is, all values in the CP are negated), the CP sequence is added before the $LTF_{tq}$ to obtain a transmit sequence Tx_$LTF_{tq}$. Finally, a time windowing operation and sending are performed. If the transmit end uses 256-point IFFT, reference may be made to FIG. 9B. FIG. 9B is a simple equivalent schematic diagram of a transmit end on a subcarrier location B of a 20 M 1×HE-LTF.

Figure 9C:
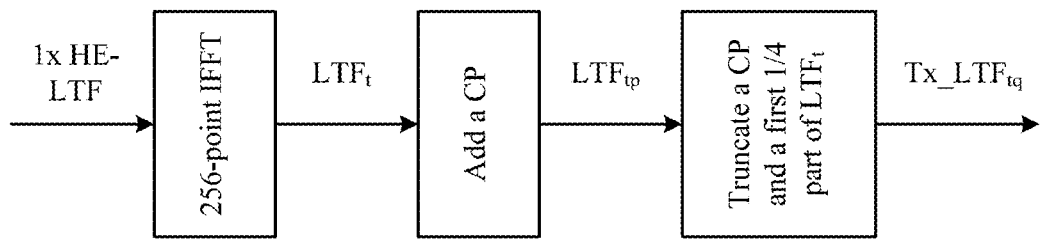

In another equivalent solution, the transmit end may perform an IFFT operation on the 1×HE-LTF sequence to obtain a time domain sequence that is $LTF_t=\{LTF_{tq}, -1\times LTF_{tq}, LTF_{tq}, -1\times LTF_{tq}\}$, where $LTF_{tq}$ is first ¼ of the time domain sequence. Then, a CP of the $LTF_t$ is obtained for the sequence $LTF_t$, and is added before the $LTF_t$ to obtain the sequence $LTF_{tp}$. Then, a CP of the sequence $LTF_{tp}$ and the first ¼ part of $LTF_t$ are truncated (that is, the CP and the $LTF_{tq}$) to obtain a transmit sequence $Tx\_LTF_{tq}$. Finally, a time windowing operation and sending are performed. If the transmit end uses 256-point IFFT, reference may be made to FIG. 9C. FIG. 9C is a simple equivalent schematic diagram of a transmit end on a subcarrier location B of a 20 M 1×HE-LTF.

Figure 10:
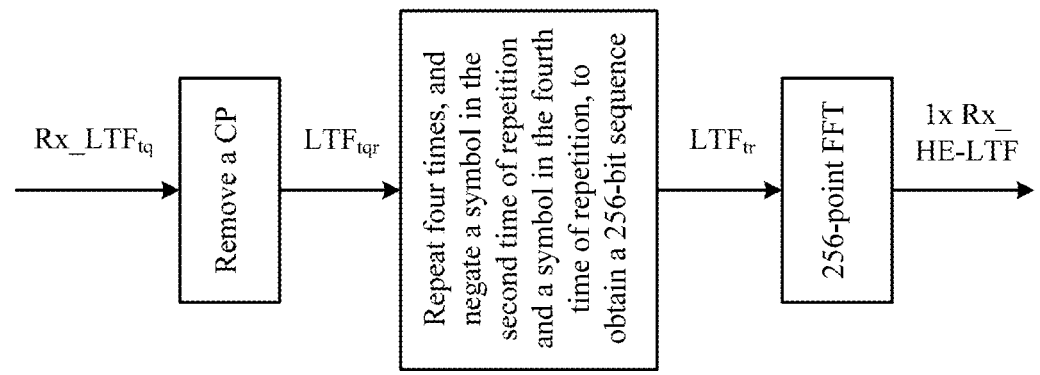
FIG. 10 is a block diagram of a receive end of a data transmission apparatus on a subcarrier location B of a 20 M 1×HE-LTF in an embodiment.

Correspondingly, it is assumed that a 1×HE-LTF time sequence received by a receive end is $Rx\_LTF_{tqr}$, and $LTF_{tqr}$ is obtained after a CP is removed. The receive end may first extend the time sequence to $LTF_{tr}=\{LTF_{tqr}, -1\times LTF_{tqr}, LTF_{tqr}, -1\times LTF_{tqr}\}$, and then perform an FFT operation on the time sequence $LTF_{tr}$. If the receive end uses 256-point FFT, reference may be made to FIG. 10. FIG. 10 is a simple schematic diagram of a receive end on a subcarrier location B of a 20 M 1×HE-LTF.

In FIG. 10, a time sequence received by a 1×HE-LTF part of the receive end is $Rx\_LTF_{tq}$, and a sequence $LTF_{tqr}$ is obtained after a front CP is removed. Then, the $LTF_{tqr}$ is repeated four times, and a symbol in the second time of repetition and a symbol in the fourth time of repetition are negated to obtain $LTF_{tr}=\{LTF_{tqr}, -1\times LTF_{tqr}, LTF_{tqr}, -1\times LTF_{tqr}\}$. Then, a 256-point FFT operation is performed on the $LTF_{tr}$, to obtain a received 1×HE-LTF frequency domain sequence that is referred to as an 1× Rx_HE-LTF.

Embodiment 3

Scenario: A 40 Mhz Bandwidth.

Additional 18 subcarrier values are added based on the following two groups of sequences: $LTF_{left}$ and $LTF_{right}$, to generate a 1×HE-LTF sequence. To ensure simple implementation, the 18 subcarrier values are selected from {1, −1}.

For example, a sequence is: HE-LTF$_{122}$(−244:4:244)= {LTF$_{right}$, −1, LTF$_{right}$, −1, −1, −1, +1, +1, −1, −1, −1, 0, +1, +1, +1, −1, −1, −1, −1, +1, −1×LTF$_{left}$, +1, LTF$_{left}$}, or may be represented as HE-LTF$_{122}$(244:4:244)={+1, −1, −1, +1, +1, −1, +1, −1, +1, −1, −1, −1, −1, +1, −1, −1, +1, −1, +1, −1, +1, +1, +1, −1, +1, −1, +1, +1, +1, −1, +1, −1, −1, −1, −1, +1, −1, −1, +1, −1, +1, −1, −1, +1, +1, +1, +1, −1, −1, −1, +1, +1, −1, −1, −1, 0, +1, +1, +1, −1, −1, −1, −1, +1, −1, +1, +1, −1, +1, −1, +1, −1, −1, −1, −1, +1, −1, −1, +1, −1, −1, −1, −1, −1, +1, +1, −1, +1, −1, +1, −1, +1, −1, +1, −1, −1, +1, +1, +1, +1, −1, −1, +1, +1, −1, +1, −1, +1, +1, +1, +1, +1, +1, −1, −1, +1, +1, −1, +1, −1, +1, +1, +1, +1}. In addition, the sequence also includes a sequence obtained after polarity of each value in the sequence is reversed (that is, 1 is changed to −1, −1 is changed to 1, and 0 remains unchanged), and remaining subcarriers are 0, that is, empty subcarriers. Herein, −244:4:244 represents −244, −240, . . . , −8, −4, 0, 4, 8, . . . , 240, and 244. In this case, corresponding pilot subcarrier locations are ±36, ±104, ±144, and ±212, that is, there are eight pilot subcarriers.

In a case of a single spatial stream, a PAPR value of a 1×HE-LTF symbol generated according to the sequence is only 4.6555 dB.

Referring to Table 7, a PAPR value caused by an inter-stream phase difference between a data subcarrier and a pilot subcarrier in a case of multiple spatial streams is listed in Table 7. The phase difference is caused by a matrix A, and the matrix A is defined in chapter 22.3.8.3.5 in the 11ac standard. PAPR flapping caused by the inter-stream phase difference between a data subcarrier and a pilot subcarrier in the case of multiple spatial streams is only 0.5273 dB, and a maximum PAPR value is 4.6555 dB. In a worst case, both a PAPR value of an existing 4×HE-LTF symbol and a PAPR value of an existing 2×HE-LTF symbol are greater than 6 dB in the 40 MHz bandwidth.

TABLE 7

| Phase Difference | 20 MHz |
| --- | --- |
| 1 | 4.6555 |
| −1 | 4.1282 |
| exp(−jπ/3) | 4.5201 |
| exp(−j2π/3) | 4.6117 |
| PAPRmax−PAPRmin | 0.5273 |

A suboptimal sequence is: HE-LTF$_{122}$(−244:4:244)= {LTF$_{right}$, −1, +1, +1, +1, −1, +1, −1, −1, +1, −1×LTF$_{left}$, 0, −1×LTF$_{right}$, +1, −1, −1, −1, −1, +1, +1, +1, +1, −1×LTF$_{left}$}, or may be represented as HE-LTF$_{122}$(244:4:244)={+1, −1, −1, +1, +1, −1, +1, −1, +1, −1, −1, −1, −1, +1, +1, −1, −1, +1, −1, +1, −1, +1, +1, +1, +1, −1, +1, +1, +1, −1, +1, −1, −1, +1, +1, +1, −1, +1, −1, +1, +1, +1, +1, −1, +1, +1, +1, −1, +1, −1, −1, +1, +1, +1, −1, −1, +1, −1, +1, −1, −1, −1, −1, 0, −1, +1, +1, −1, −1, +1, −1, +1, −1, +1, +1, +1, +1, +1, +1, −1, −1, +1, +1, +1, −1, +1, −1, +1, −1, −1, −1, −1, +1, −1, −1, −1, −1, +1, +1, +1, +1, −1, −1, +1, +1, −1, −1, +1, +1, −1, −1, −1, −1, +1, +1, −1, −1, +1, −1, +1, −1, −1, −1, −1}. In addition, the sequence also includes a sequence obtained after polarity of each value in the sequence is reversed (that is, +1 is changed to −1, −1 is changed to +1, and 0 remains unchanged), and remaining subcarriers are 0, that is, empty subcarriers. Herein, −244:4:244 represents −244, −240, . . . , −8, −4, 0, 4, 8, . . . , 240, and 244. In this case, corresponding pilot subcarrier locations are ±36, ±104, ±144, and ±212, that is, there are eight pilot subcarriers.

In a case of a single spatial stream, a PAPR value of a 1×HE-LTF symbol generated according to the sequence is only 4.6831 dB.

Referring to Table 8, a PAPR value caused by an inter-stream phase difference between a data subcarrier and a pilot subcarrier in a case of multiple spatial streams is listed in Table 8. The phase difference is caused by a matrix A, and the matrix A is defined in chapter 22.3.8.3.5 in the 11ac standard. PAPR flapping caused by the inter-stream phase difference between a data subcarrier and a pilot subcarrier in the case of multiple spatial streams is only 0.3397 dB, and a maximum PAPR value is 4.8335 dB. In a worst case, both a PAPR value of an existing 4×HE-LTF symbol and a PAPR value of an existing 2×HE-LTF symbol are greater than 6 dB in the 40 MHz bandwidth.

TABLE 8

| Phase Difference | 20 MHz |
| --- | --- |
| 1 | 4.6831 |
| −1 | 4.4938 |

TABLE 8-continued

| Phase Difference | 20 MHz |
| --- | --- |
| exp(−jπ/3) | 4.7504 |
| exp(−j2π/3) | 4.8335 |
| PAPRmax−PAPRmin | 0.3397 |

A further suboptimal sequence is: HE-LTF$_{122}$(−244:4:244)={+1, +1, +1, LTF$_{left}$, +1, LTF$_{right}$, +1, −1, −1, +1, −1, 0, +1, −1×LTF$_{left}$, −1, −1×LTF$_{right}$, −1, −1, +1, +1, −1, +1, −11, or may be represented as HE-LTF$_{122}$(244:4:244)={+1, +1, +1, +1, +1, −1, −1, +1, +1, −1, +1, −1, +1, +1, +1, +1, +1, +1, −1, −1, +1, +1, −1, +1, −1, +1, +1, +1, +1, +1, −1, −1, +1, +1, −1, +1, −1, +1, −1, −1, −1, −1, −1, +1, +1, −1, −1, +1, −1, +1, −1, +1, +1, +1, +1, −1, −1, +1, −1, 0, +1, −1, −1, +1, +1, −1, −1, +1, −1, +1, −1, −1, −1, −1, −1, −1, +1, +1, −1, −1, +1, −1, +1, −1, −1, −1, −1, −1, −1, +1, +1, −1, −1, +1, −1, +1, −1, +1, +1, +1, +1, −1, −1, +1, +1, −1, +1, −1, +1, −1, −1, −1, −1, −1, −1, +1, +1, −1, +1, −1}. In addition, the sequence also includes a sequence obtained after polarity of each value in the sequence is reversed (that is, +1 is changed to −1, −1 is changed to +1, and 0 remains unchanged), and remaining subcarriers are 0, that is, empty subcarriers. Herein, −244:4:244 represents −244, −240, . . . , −8, −4, 0, 4, 8, . . . , 240, and 244. In this case, corresponding pilot subcarrier locations are ±36, ±104, ±144, and ±212, that is, there are eight pilot subcarriers.

In a case of a single spatial stream, a PAPR value of a 1×HE-LTF symbol generated according to the sequence is only 5.1511 dB.

Referring to Table 9, a PAPR value caused by an inter-stream phase difference between a data subcarrier and a pilot subcarrier in a case of multiple spatial streams is listed in Table 9. The phase difference is caused by a matrix A, and the matrix A is defined in chapter 22.3.8.3.5 in the 11ac standard. PAPR flapping caused by the inter-stream phase difference between a data subcarrier and a pilot subcarrier in the case of multiple spatial streams is only 0.1 dB, and a maximum PAPR value is 5.1511 dB. In a worst case, both a PAPR value of an existing 4×HE-LTF symbol and a PAPR value of an existing 2×HE-LTF symbol are greater than 6 dB in the 40 MHz bandwidth.

TABLE 9

| Phase Difference | 20 MHz |
| --- | --- |
| 1 | 5.1511 |
| −1 | 5.0511 |
| exp(−jπ/3) | 5.0733 |
| exp(−j2π/3) | 5.0643 |
| PAPRmax−PAPRmin | 0.1000 |

A still suboptimal sequence is: HE-LTF$_{122}$(−244:4:244)= {+1, +1, −1, LTF$_{left}$, +1, LTF$_{right}$, +1, +1, −1, +1, +1, 0, −1, −1×LTF$_{left}$, −1, −1×LTF$_{right}$, −1, +1, +1, +1, +1, +1, −11, or may be represented as HE-LTF$_{122}$(244:4:244)={+1, +1, −1, +1, +1, −1, −1, +1, +1, −1, +1, −1, +1, +1, +1, +1, +1, +1, −1, −1, +1, +1, −1, +1, −1, +1, +1, +1, +1, +1, −1, −1, +1, +1, −1, +1, −1, +1, −1, −1, −1, −1, −1, +1, +1, −1, −1, +1, −1, +1, +1, +1, +1, +1, −1, +1, +1, 0, −1, −1, −1, +1, +1, −1, −1, +1, −1, +1, −1, −1, −1, −1, −1, −1, +1, +1, −1, −1, +1, −1, +1, −1, −1, −1, −1, −1, −1, +1, +1, −1, −1, +1, +1, +1, +1, +1, −1, −1, +1, +1, −1, −1, +1, +1, −1, −1, −1, −1, +1, +1, +1, +1, +1, −1}. In addition, the sequence also includes a sequence obtained after polarity of each value in the sequence is reversed (that is, +1 is changed to −1, −1 is changed to +1, and 0 remains unchanged), and remaining subcarriers are 0, that is, empty subcarriers.

In a case of a single spatial stream, a PAPR value of a 1×HE-LTF symbol generated according to the sequence is only 4.9848 dB.

Referring to Table 10, a PAPR value caused by an inter-stream phase difference between a data subcarrier and a pilot subcarrier in a case of multiple spatial streams is listed in Table 10. The phase difference is caused by a matrix A, and the matrix A is defined in chapter 22.3.8.3.5 in the 11ac standard. PAPR flapping caused by the inter-stream phase difference between a data subcarrier and a pilot subcarrier in the case of multiple spatial streams is 0.3083 dB, and a maximum PAPR value is 5.2026 dB.

TABLE 10

| Phase Difference | 20 MHz |
| --- | --- |
| 1 | 4.9848 |
| −1 | 4.8943 |
| exp(−jπ/3) | 5.0471 |
| exp(−j2π/3) | 5.2026 |
| PAPRmax−PAPRmin | 0.3083 |

Embodiment 4

Scenario: an 80 MHz Bandwidth.

Additional 42 subcarrier values are added based on the following two groups of sequences: LTF$_{left}$ and LTF$_{right}$, to generate a 1×HE-LTF sequence. To ensure simple implementation, the 42 subcarrier values are selected from {+1, −1}.

An optimal sequence is: HE-LTF$_{250}$(−500:4:500)={−1, −1, +1, +1, +1, +1, −1, −1×LTF$_{left}$, −1×LTF$_{right}$, +1, −1, −1, −1, −1, −1, +1, LTF$_{left}$, −1×LTF$_{right}$, +1, −1, +1, −1, −1, +0, −1, +1, +1, −1, −1, LTF$_{left}$, LTF$_{right}$, −1, +1, −1, −1, +1, −1, −1, +1, LTF$_{left}$, −1×LTF$_{right}$, +1, −1, +1, −1, −1, −1, +1, +1}, or, it may be represented as $$HE\text{-}LTF_{250}(-500:4:500) =$$

{−1, −1, +1, +1, +1, +1, +1, −1, −1, −1, +1, +1, −1, −1, +1, −1, +1,

−1, −1, −1, −1, −1, −1, +1, +1, −1, −1, +1, −1, +1, −1, −1, −1, −1,

−1, +1, +1, −1, −1, +1, −1, +1, −1, +1, +1, +1, +1, +1, −1, −1, +1,

+1, −1, +1, −1, +1, −1, −1, −1, +1, −1, −1, −1, −1, −1, −1, +1,

+1, +1, −1, −1, +1, −1, +1, −1, +1, +1, +1, +1, +1, +1, +1, −1, −1,

+1, +1, −1, +1, −1, +1, +1, +1, −1, +1, +1, −1, −1, +1, −1, +1,

−1, +1, +1, +1, +1, +1, −1, +1, +1, −1, +1, −1, +1, −1, −1, −1,

−1, +1, −1, +1, −1, −1, 0, −1, +1, +1, −1, −1, +1, +1, −1, −1, +1,

+1, −1, +1, −1, +1, +1, +1, +1, +1, −1, −1, +1, +1, −1, +1, −1,

+1, +1, +1, +1, +1, −1, +1, +1, −1, +1, +1, −1, −1, −1, −1,

−1, +1, +1, −1, −1, +1, −1, +1, −1, +1, +1, +1, +1, −1, +1, −1, −1,

+1, −1, −1, +1, +1, +1, −1, −1, +1, +1, −1, +1, −1, +1, +1, +1,

+1, +1, +1, −1, −1, +1, +1, −1, −1, +1, +1, +1, +1, +1, −1, +1,

+1, −1, −1, +1, −1, +1, +1, +1, +1, +1, +1, −1, −1, +1, +1,

−1, +1, −1, +1, −1, −1, −1, −1, +1, −1, +1, −1, −1, −1, +1, +1};

In addition, the sequence also includes a sequence obtained after polarity of each value in the sequence is reversed (that is, +1 is changed to −1, −1 is changed to +1, and 0 remains unchanged), and remaining subcarriers are 0, that is, empty subcarriers. Herein, −500:4:500 represents −500, −496, . . . , −8, −4, 0, 4, 8, . . . , 496, and 500. In this case, corresponding pilot subcarrier locations are ±24, ±92, ±400, and ±468, that is, there are eight pilot subcarriers. In a case of a single spatial stream, a PAPR value of a 1×HE-LTF symbol generated according to the sequence is only 4.8609 dB. PAPR flapping caused by an inter-stream phase difference between a data subcarrier and a pilot subcarrier in a case of multiple spatial streams is only 0.1413 dB, and a maximum PAPR value is 5.0022 dB. In a worst case, both a PAPR value of an existing 4×HE-LTF symbol and a PAPR value of an existing 2×HE-LTF symbol are greater than 6 dB in the 80 MHz bandwidth. It should be noted herein that the optimal sequence herein means that left and right parts of the sequence can be combined to form a group of 160 M 1×HE-LTF sequences with excellent performance.

The sequence in the foregoing implementation is a sequence represented by every four bits, and is expressed by 0 on a spacing location. A person of ordinary skill in the art may directly and undoubtedly obtain a 1×HE-LTF sequence, expressed in another manner, in the 80 M bandwidth. For example, a value 0 on another location is supplemented. A person skilled in the art may understand that the sequence is the same as the foregoing sequence in essence, and only a different expression manner is used and essence of the technical solution is not affected.

$HELTF_{-500,500} =$

{−1, 0, 0, 0, −1, 0, 0, 0, +1, 0, 0, 0, +1, 0, 0, 0, +1, 0, 0, 0, +1, 0, 0, 0,

+1, 0, 0, 0, −1, 0, 0, 0, −1, 0, 0, 0, −1, 0, 0, 0, +1, 0, 0, 0, +1, 0, 0,

0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0,

−1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0,

+1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0,

+1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0,

+1, 0, 0, 0, +1, 0, 0, 0, +1, 0, 0, 0, +1, 0, 0, 0, +1, 0, 0, 0,

0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0,

+1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0,

+1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0,

0, −1, 0, 0, 0, +1, 0, 0, 0, 0, −1, 0, 0, 0, −1, 0, 0, 0, 0, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0,

−1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, 0, +1, 0, 0, 0, −1, 0, 0, 0, −1, 0, 0, 0, +1, 0, 0, 0, +1, 0, 0, 0,

−1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, 0, +1, 0, 0, 0, −1, 0, 0, 0, +1, 0, 0, 0, −1, 0, 0, 0, +1, 0, 0, 0,

0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0,

−1, 0, 0, 0, −1, 0, 0, 0, −1, 0, 0, 0, −1, 0, 0, 0, +1, 0, 0, 0, −1, 0, 0,

0, +1, 0, 0, 0, −1, 0, 0, 0, −1, 0, 0, 0, +1, 0, 0, 0, +1}

| Phase Difference | 20 MHz |
|---|---|
| 1 | 4.8609 |
| −1 | 4.9858 |
| exp(−jπ/3) | 5.0022 |
| exp(−j2π/3) | 5.0021 |
| PAPRmax−PAPRmin | 0.1413 |

A suboptimal sequence is: HE-LTF$_{250}$(−500:4:500)={+1, −1, −1, +1, −1, +1, +1, −1, LTF$_{left}$, LTF$_{right}$, +1, +1, −1, +1, +1, −1, −1, −1, LTF$_{left}$, −1×LTF$_{right}$, +1, −1, −1, −1, −1, 0, +1, +1, +1, −1, −1, LTF$_{left}$, LTF$_{right}$, −1, +1, +1, +1, +1, −1, +1, −1, −1×LTF$_{left}$, LTF$_{right}$, +1, +1, +1, +1, −1, −1, −1, +1}, or may be represented as HE-LTF$_{250}$(−500:4:500)={+1, −1, −1, +1, −1, +1, +1, −1, +1, +1, −1, −1, +1, +1, −1, +1, −1, +1, +1, +1, +1, +1, +1, −1, −1, +1, +1, −1, +1, −1, +1, +1, +1, +1, +1, −1, −1, +1, +1, −1, +1, −1, −1, −1, −1, +1, +1, −1, −1, +1, +1, −1, +1, −1, −1, −1, −1, −1, +1, +1, −1, −1, +1, −1, −1, +1, +1, +1, +1, −1, −1, +1, +1, −1, +1, −1, +1, +1, −1, +1, −1, −1, −1, +1, +1, −1, −1, +1, +1, −1, +1, −1, +1, +1, +1, +1, +1, −1, −1, +1, +1, −1, +1, −1, +1, +1, +1, −1, +1, +1, −1, −1, −1, +1, −1, +1, +1, +1, +1, −1, −1, −1, +1, +1, −1, +1, +1, −1, −1, −1, 0, +1, +1, +1, −1, −1, +1, +1, −1, −1, +1, +1, −1, +1, −1, +1, +1, +1, +1, +1, −1, −1, +1, +1, −1, +1, −1, +1, +1, +1, +1, +1, −1, −1, +1, +1, −1, +1, −1, +1, −1, −1, +1, −1, +1, +1, +1, −1, −1, +1, +1, +1, +1, +1, +1, +1, +1, +1, +1, −1, +1, +1, +1, +1, −1, +1, −1, +1, +1, −1, +1, −1, +1, +1, +1, +1, −1, −1, +1, +1, +1, +1, −1, +1, −1, −1, −1, −1, −1, −1, +1, +1, −1, −1, +1, −1, +1, −1, −1, −1, −1, +1, −1, −1, +1, +1, −1, +1, −1, +1, −1, −1, −1, −1, −1, +1, +1, −1, −1, +1, −1, +1, −1, +1, +1, +1, +1, +1, +1, +1, +1, −1, −1, −1, +1}. In addition, the sequence also includes a sequence obtained after polarity of each value in the sequence is reversed (that is, +1 is changed to −1, −1 is changed to +1, and 0 remains unchanged), and remaining subcarriers are 0, that is, empty subcarriers. Herein, −500:4:500 represents −500, −496, . . . , −8, −4, 0, 4, 8, . . . , 496, and 500. In this case, corresponding pilot subcarrier locations are ±24, ±92, ±400, and ±468, that is, there are eight pilot subcarriers.

In a case of a single spatial stream, a PAPR value of a 1×HE-LTF symbol generated according to the sequence is only 4.8024 dB.

Referring to Table 11, a PAPR value caused by an inter-stream phase difference between a data subcarrier and a pilot subcarrier in a case of multiple spatial streams is listed in Table 11. PAPR flapping caused by the inter-stream phase difference between a data subcarrier and a pilot subcarrier in the case of multiple spatial streams is only 0.1324 dB, and a maximum PAPR value is 4.9348 dB. In a worst case, both a PAPR value of an existing 4×HE-LTF symbol and a PAPR value of an existing 2×HE-LTF symbol are greater than 6 dB in the 80 MHz bandwidth.

TABLE 11

| Phase Difference | 20 MHz |
| --- | --- |
| 1 | 4.8024 |
| −1 | 4.8680 |
| exp(−jπ/3) | 4.8809 |
| exp(−j2π/3) | 4.9348 |
| PAPRmax−PAPRmin | 0.1324 |

A further suboptimal sequence is: HE-LTF$_{250}$(−500:4:500)={−1, +1, +1, +1, −1, +1, +1, +1, −1×LTF$_{left}$, −1×LTF$_{right}$, +1, −1, −1, −1, −1, −1, +1, +1, LTF$_{left}$, −1×LTF$_{right}$, +1, −1, +1, −1, −1, +0, +1, −1, +1, +1, +1, −1×LTF$_{left}$, −1×LTF$_{right}$, +1, −1, +1, +1, −1, −1, +1, −1, −1×LTF$_{left}$, LTF right, −1, +1, +1, +1, +1, −1, −1, −1}, or may be represented as HE-LTF$_{250}$(−500:4:500)={−1, +1, +1, +1, −1, +1, +1, +1, −1, −1, +1, +1, −1, −1, +1, −1, +1, −1, −1, −1, −1, −1, +1, +1, −1, −1, +1, −1, +1, −1, −1, −1, −1, −1, −1, −1, +1, +1, −1, −1, +1, +1, +1, +1, +1, +1, −1, −1, +1, −1, −1, −1, −1, −1, −1, −1, +1, −1, −1, +1, +1, +1, +1, +1, +1, −1, −1, +1, −1, +1, −1, −1, +1, +1, +1, +1, +1, +1, +1, +1, +1, +1, −1, −1, −1, −1, −1, −1, −1, −1, −1, −1, −1, −1, +1, −1, −1, +1, +1, −1, +1, +1, +1, −1, −1, +1, +1, −1, −1, +1, −1, −1, +0, +1, −1, +1, +1, +1, −1, −1, +1, +1, −1, −1, +1, −1, +1, −1, −1, −1, −1, −1, −1, +1, +1, −1, −1, +1, −1, +1, −1, −1, −1, −1, −1, +1, +1, −1, −1, +1, −1, +1, +1, +1, −1, −1, +1, +1, −1, −1, +1, −1, −1, −1, −1, −1, +1, +1, −1, −1, +1, −1, +1, −1, −1, −1, −1, −1, −1, −1, +1, +1, −1, −1, +1, +1, +1, +1, +1, +1, −1, −1, −1, +1, +1, −1, −1, +1, −1, +1, −1, +1, +1, +1, +1, −1, +1, +1, +1, +1, −1, −1, −1}. In addition, the sequence also includes a sequence obtained after polarity of each value in the sequence is reversed (that is, +1 is changed to −1, −1 is changed to +1, and 0 remains unchanged), and remaining subcarriers are 0, that is, empty subcarriers.

In a case of a single spatial stream, a PAPR value of a 1×HE-LTF symbol generated according to the sequence is only 4.97 dB.

Referring to Table 12, a PAPR value caused by an inter-stream phase difference between a data subcarrier and a pilot subcarrier in a case of multiple spatial streams is listed in Table 12. PAPR flapping caused by the inter-stream phase difference between a data subcarrier and a pilot subcarrier in the case of multiple spatial streams is only 0.26 dB, and a maximum PAPR value is 4.97 dB.

TABLE 12

| Phase Difference | 20 MHz |
| --- | --- |
| 1 | 4.97 |
| −1 | 4.71 |
| exp(−jπ/3) | 4.96 |
| exp(−j2π/3) | 4.86 |
| PAPRmax−PAPRmin | 0.26 |

A still suboptimal sequence is: HE-LTF$_{250}$(−500:4:500)= 1-1, −1, −1, +1, +1, +1, +1, +1, −1×LTF$_{left}$, −1×LTF$_{right}$, +1, −1, +1, −1, −1, −1, −1, −1, LTF$_{left}$, −1×LTF$_{right}$, +1, −1, +1, −1, −1, +0, −1, +1, +1, −1, −1, LTF$_{left}$, LTF$_{right}$, −1, +1, −1, −1, +1, −1, −1, +1, LTF$_{left}$, −1×LTF$_{right}$, +1, −1, +1, −1, −1, −1, +1, +1}, or may be represented as HE-LTF$_{250}$(−500:4:500)=1-1, −1, −1, +1, +1, +1, +1, +1, −1, −1, +1, +1, −1, −1, +1, −1, +1, −1, −1, −1, −1, −1, −1, +1, +1, −1, −1, +1, −1, +1, −1, −1, −1, −1, −1, +1, +1, −1, −1, +1, −1, +1, −1, +1, +1, +1, +1, +1, −1, −1, +1, +1, −1, +1, −1, +1, +1, −1, −1, −1, −1, −1, −1, −1, +1, +1, −1, −1, +1, +1, +1, −1, +1, −1, +1, +1, +1, +1, +1, +1, −1, −1, +1, +1, −1, −1, +1, +1, +1, −1, +1, −1, +1, −1, −1, +1, −1, −1, +1, +1, +1, +1, +1, −1, −1, +1, −1, +1, −1, +1, −1, −1, +1, −1, −1, +0, −1, +1, +1, −1, −1, +1, −1, −1, +1, −1, +1, −1, +1, +1, +1, +1, +1, +1, −1, −1, +1, −1, +1, −1, +1, −1, +1, +1, +1, +1, +1, +1, −1, −1, +1, −1, +1, −1, −1, −1, −1, −1, −1, −1, +1, −1, +1, −1, +1, +1, +1, +1, −1, −1, +1, +1, +1, +1, +1, −1, −1, +1, −1, +1, −1, +1, +1, +1, +1, +1, +1, −1, −1, +1, −1, −1, +1, −1, +1, +1, +1, +1, +1, +1, −1, −1, +1, −1, +1, −1, +1, +1, +1, +1, +1, +1, −1, +1, −1, +1, +1, +1, +1, +1, +1, −1, −1, +1, −1, −1, +1, −1, +1, +1, +1, +1, +1, +1, −1, −1, −1, +1, −1, +1, −1, −1, −1, +1, +1}. In addition, the sequence also includes a sequence obtained after polarity of each value in the sequence is reversed (that is, +1 is changed to −1, −1 is changed to +1, and 0 remains unchanged), and remaining subcarriers are 0, that is, empty subcarriers.

In a case of a single spatial stream, a PAPR value of a 1×HE-LTF symbol generated according to the sequence is only 4.53 dB.

Referring to Table 13, a PAPR value caused by an inter-stream phase difference between a data subcarrier and a pilot subcarrier in a case of multiple spatial streams is listed in Table 13. PAPR flapping caused by the inter-stream phase difference between a data subcarrier and a pilot subcarrier in the case of multiple spatial streams is only 0.52 dB, and a maximum PAPR value is 5.05 dB.

TABLE 13

| Phase Difference | 20 MHz |
| --- | --- |
| 1 | 4.53 |
| −1 | 4.91 |
| exp(−jπ/3) | 5.03 |
| exp(−j2π/3) | 5.05 |
| PAPRmax−PAPRmin | 0.52 |

Embodiment 5

Solution 1 in a 160 MHz bandwidth.

A subcarrier of the 160 MHz bandwidth may be obtained by splicing two 80 MHz subcarriers. A primary 80 M frequency band and a secondary 80 M frequency band may be spliced continuously or spaced by a particular bandwidth (for example, spaced by 100 MHz). In addition, frequency band locations of the primary 80 M frequency band and the secondary 80 M frequency band may be flexibly adjusted according to an actual situation. Therefore, 1× HE-LTF sequences of the primary 80 M frequency band and the secondary 80 M frequency band may be separately defined, and polarity is adjusted by using an entire 80 M sequence as a unit and based on a spacing between the primary 80 M frequency band and the secondary 80 M frequency band and frequency band order of the primary 80 M frequency band and the secondary 80 M frequency band, to obtain a lower PAPR.

Herein, it is assumed that the optimal sequence in Embodiment 4 corresponds to $HE\text{-}LTF_{80M\_A}$, and $HE\text{-}LTF_{80M\_A}(-500:4:500)=\{L\text{-}LTF_{80M\_A}, 0, R\text{-}LTF_{80M\_A}\}$. The sequences $L\text{-}LTF_{80M\_A}$ and $R\text{-}LTF_{80M\_A}$ are used as basic sequences, to respectively generate a primary 80 M sequence and a secondary 80 M sequence. A primary 80 M 1×HE-LTF sequence is $LTF_{80M\_Primary}=\{L\text{-}LTF_{80M\_A}, 0, R\text{-}LTF_{80M\_A}\}$, and a secondary 80 M 1×HE-LTF sequence is $LTF_{80M\_Secondary}=\{L\text{-}LTF_{80M\_A}, 0, -1\times R\text{-}LTF_{80M\_A}\}$.

For ease of description, it is assumed that P1 indicates a polarity adjustment coefficient of the primary 80 M sequence, and P2 indicates a polarity adjustment coefficient of the secondary 80 M sequence. If P1 is +1, P2 may be +1 or −1. In this case, when a location relationship of two 80 M channels is [Primary 80 M, Secondary 80 M], a 160 M sequence is: $HE\text{-}LTF_{500}=[P1\times LTF_{80M\_Primary}, BI, P2\times LTF_{80M\_Secondary}]$. When a location relationship of two 80 M channels is [Secondary 80 M, Primary 80 M], a 160 M sequence is: $HE\text{-}LTF_{500}=[P2\times LTF_{80M\_Secondary}, BI, P1\times LTF_{80M\_Primary}]$. The BI is a frequency spacing between subcarriers on edges of the two 80 M channels (that is, the BI is a sequence carried on a subcarrier between the subcarriers on the edges of the two 80 M channels). When the primary 80 M channel and the secondary 80 M channel are adjacent, the BI={0, 0, 0, 0, 0}. When the primary 80 M channel and the secondary 80 M channel are not adjacent, the BI may be correspondingly adjusted. In addition, the primary 80 M channel and the secondary 80 M channel may be independently generated, and then spliced to generate a 160 M frequency band.

Polarity adjustment coefficients of a primary 80 MHz bandwidth and a secondary 80 MHz bandwidth in two types of frequency band order and various frequency spacings are shown in the following table. A primary-secondary channel spacing is a center frequency spacing between two 80 M frequency bands (a spacing of 80 MHz is obtained by splicing two adjacent 80 M channels). Specifically, corresponding PAPR values in various cases are also shown in the table. The PAPR value is a maximum value between data and a pilot in four phase differences. It can be learned from the following table that there are only a few cases in which polarity of the primary 80 M sequence and polarity of the secondary 80 M sequence need to be adjusted, and in most cases, the primary 80 M sequence and the secondary 80 M sequence are directly spliced. For example, when a location relationship of two adjacent 80 M channels is [Primary 80 M, Secondary 80 M], a 160 M sequence is specifically $HE\text{-}LTF_{500}(-1012:4:1012)=\{L\text{-}LTF_{80M\_A}, 0, R\text{-}LTF_{80M\_A}, 0, 0, 0, 0, 0, L\text{-}LTF_{80M\_A}, 0, -1\times R\text{-}LTF_{80M\_A}\}$.

| Primary-secondary channel spacing (MHz) | [Primary 80 M, Secondary 80 M] [P1, P2] | PAPR (dB) | [Secondary 80 M, Primary 80 M] [P2, P1] | PAPR (dB) |
|---|---|---|---|---|
| 80 (adjacent) | [+1, +1] | 5.12 | [+1, +1] | 5.14 |
| 100 | [+1, +1] | 5.15 | [+1, +1] | 5.32 |
| 120 | [+1, +1] | 5.29 | [+1, +1] | 5.41 |
| 140 | [+1, +1] | 5.24 | [+1, +1] | 5.37 |
| 160 | [+1, +1] | 5.30 | [+1, +1] | 5.32 |
| 180 | [+1, +1] | 5.33 | [+1, +1] | 5.40 |
| 200 | [+1, +1] | 5.41 | [+1, +1] | 5.40 |
| 220 | [+1, +1] | 5.40 | [−1, +1] | 5.40 |
| 240 | [+1, +1] | 5.43 | [+1, +1] | 5.42 |
| >240 | [+1, −1] | ~5.44 | [−1, +1] | ~5.35 |

In addition, to reduce system implementation complexity, specific PAPR performance may be selected for sacrifice. In various cases, the primary 80 M sequence and the secondary 80 M sequence are directly spliced, to obtain a 1×HE-LTF sequence in the 160 M bandwidth.

The sequence in the foregoing implementation is a sequence represented by every four bits, and is 0 on a spacing location. The foregoing example in which $HE\text{-}LTF_{500}=[P1\times LTF_{80M\_Primary}, BI, P2\times LTF_{80M\_Secondary}]$, P1 is +1, and P2 is +1 is used. A person of ordinary skill in the art may directly and undoubtedly obtain a sequence expressed in another manner, that is, a manner of supplementing a value 0 on another location in the entire sequence. A person skilled in the art may understand that the sequence is substantially the same as the foregoing sequence, and only a different expression manner is used and essence of the technical solution is not affected.

$HE\text{-}LTF_{-1012:1:1012} = \{LTF'_{80M\_Primary}, 0, 0, 0, 0, 0, 0, 0, 0, 0, 0, 0, 0, 0, 0, 0, 0, 0, 0, 0, 0, LTF'_{80M\_Secondary}\}$, where $LTF'_{80M\_Primary}=\{L\text{-}LTF'_{80M\_A}, 0, R\text{-}LTF'_{80M\_A}\}$, and
$LTF'_{80M\_Secondary}=\{L\text{-}LTF'_{80M\_A}, 0, -1\times R\text{-}LTF'_{80M\_A}\}$.

It can be directly and undoubtedly learned from the sequence in Embodiment 4 that $L-LTF'_{80M\_A} =$

{−1, 0, 0, 0, −1, 0, 0, 0, +1, 0, 0, 0, +1, 0, 0, 0, +1, 0, 0, 0, +1, 0, 0, 0,

+1, 0, 0, 0, −1, 0, 0, 0, −1, 0, 0, 0, −1, 0, 0, 0, +1, 0, 0, 0, +1, 0, 0,

0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0,

+1, 0, 0, 0, −1, 0, 0, 0, −1, 0, 0, 0, −1, 0, 0, 0, −1, 0, 0, 0, −1, 0, 0,

0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0,

0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0,

0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0,

−1, 0, 0, 0, +1, 0, 0, 0, −1, 0, 0, 0, +1, 0, 0, 0, +1, 0, 0, 0, +1, 0, 0,

-continued

0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0,

+1, 0, 0, 0, +1, 0, 0, 0, +1, 0, 0, 0, −1, 0, 0, 0, +1, 0, 0, 0, +1, 0, 0,

0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0,

−1, 0, 0, 0, −1, 0, 0, 0, +1, 0, 0, 0, +1, 0, 0, 0, −1, 0, 0, 0, +1, 0, 0,

0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0}, and $R\text{-}LTF'_{80M\_A} =$

{0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0,

−1, 0, 0, 0, +1, 0, 0, 0, −1, 0, 0, 0, +1, 0, 0, 0, +1, 0, 0, 0, +1, 0, 0,

0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0,

+1, 0, 0, 0, +1, 0, 0, 0, −1, 0, 0, 0, +1, 0, 0, 0, −1, 0, 0, 0, +1, 0, 0,

0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0,

0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0,

−1, 0, 0, 0, −1, 0, 0, 0, +1, 0, 0, 0, +1, 0, 0, 0, +1, 0, 0, 0, −1, 0, 0,

0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0,

+1, 0, 0, 0, −1, 0, 0, 0, −1, 0, 0, 0, +1, 0, 0, 0, +1, 0, 0, 0, −1, 0, 0,

0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0,

+1, 0, 0, 0, −1, 0, 0, 0, +1, 0, 0, 0, −1, 0, 0, 0, +1, 0, 0, 0, +1, 0, 0,

0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0,

−1, 0, 0, 0, −1, 0, 0, 0, −1, 0, 0, 0, −1, 0, 0, 0, +1, 0, 0, 0, −1, 0, 0,

0, +1, 0, 0, 0, −1, 0, 0, 0, −1, 0, 0, 0, −1, 0, 0, 0, +1, 0, 0, 0, +1}.

Solution 2 in a 160 MHz bandwidth:

A subcarrier of the 160 MHz bandwidth is obtained by repeating an 80 MHz subcarrier and then directly splicing 80 MHz subcarriers. Therefore, a 1×HE-LTF sequence in the 160 M bandwidth is generated based on the suboptimal 1×HE-LTF sequence in the 80 M bandwidth in Embodiment 4. For ease of description, the suboptimal sequence is referred to as an HE-LTF$_{80M}$, and HE-LTF$_{80M}$(−500:4:500)= {L-LTF$_{80M}$, 0, R-LTF$_{80M}$}. A sequence in the solution 1 in the 160 MHz bandwidth is: HE-LTF$_{500}$(−1012:4:1012)={L-LTF$_{80M}$, 0, R-LTF$_{80M}$, 0, 0, 0, 0, 0, −1×L-LTF$_{80M}$, 0, R-LTF$_{80M}$}, and remaining subcarriers are 0, that is, empty subcarriers. Herein, −1012:4:1012 represents −1012, −1008, ..., −8, −4, 0, 4, 8, ..., 1008, and 1012. In this case, corresponding pilot subcarrier locations are ±44, ±112, ±420, ±488, ±536, ±604, ±912, and ±980, that is, there are 16 pilot subcarriers.

In a case of a single spatial stream, a PAPR value of a 1×HE-LTF symbol generated according to the sequence is only 5.7413 dB.

A PAPR value caused by an inter-stream phase difference between a data subcarrier and a pilot subcarrier in a case of multiple spatial streams is listed in Table 14. PAPR flapping caused by the inter-stream phase difference between a data subcarrier and a pilot subcarrier in the case of multiple spatial streams is 0.3948 dB, and a maximum PAPR value is only 5.9667 dB.

TABLE 14

| Phase Difference | 20 MHz |
| --- | --- |
| 1 | 5.7413 |
| −1 | 5.5883 |
| exp(−jπ/3) | 5.9485 |
| exp(−j2π/3) | 5.9667 |
| PAPRmax−PAPRmin | 0.2254 |

Another Solution in a 160 MHz Bandwidth:

A subcarrier of the 160 MHz bandwidth may be obtained by splicing two 80 MHz subcarriers. A primary 80 M frequency band and a secondary 80 M frequency band may be spliced continuously or spaced by a particular bandwidth (for example, spaced by 100 MHz). In addition, frequency band locations of the primary 80 M frequency band and the secondary 80 M frequency band may be flexibly adjusted according to an actual situation. Therefore, 1× HE-LTF sequences of the primary 80 M frequency band and the secondary 80 M frequency band may be separately defined, and polarity is adjusted by using an entire 80 M sequence as a unit and based on a spacing between the primary 80 M frequency band and the secondary 80 M frequency band and frequency band order of the primary 80 M frequency band and the secondary 80 M frequency band, to obtain a lower PAPR.

Herein, the suboptimal sequence and the further suboptimal sequence in Embodiment 4 are respectively used as a primary 80 M sequence and a secondary 80 M sequence, and are spliced to obtain a new 1×HE-LTF sequence in the 160 MHz bandwidth.

For ease of description, the suboptimal sequence in Embodiment 4 is referred to as LTF$_{80M\_Primary}$, and the further suboptimal sequence in Embodiment 4 is referred to as LTF$_{80M\_Secondary}$. It is assumed that P1 indicates a polarity adjustment coefficient of the primary 80 M sequence, and P2 indicates a polarity adjustment coefficient of the secondary 80 M sequence. If P1 is +1, P2 may be +1 or −1. In this case, when a placement relationship of two 80 M channels is [Primary 80 M, Secondary 80 M], a 160 M sequence is: HE-LTF$_{500}$=[P1×LTF$_{80M\_Primary}$, BI, P2×LTF$_{80M\_Secondary}$]. When a placement relationship of two 80 M channels is [Secondary 80 M, Primary 80 M], a 160 M sequence is: HE-LTF$_{500}$=[P2×LTF$_{80M\_Secondary}$, BI, P1×LTF$_{80M\_Primary}$]. The BI is a frequency spacing between subcarriers on edges of two 80 M channels. When the primary 80 M channel and the secondary 80 M channel are adjacent, the BI={0, 0, 0, 0, 0}. When the primary 80 M channel and the secondary 80 M channel are not adjacent, the BI may be correspondingly adjusted. In addition, the primary 80 M channel and the secondary 80 M channel may be independently generated, and then spliced to generate a 160 M frequency band.

Polarity adjustment coefficients of a primary 80 MHz bandwidth and a secondary 80 MHz bandwidth in two types of frequency band order and various frequency spacings are shown in the following Table 15. A primary-secondary channel spacing is a center frequency spacing between two 80 M frequency bands (a spacing of 80 MHz is obtained by splicing two adjacent 80 M channels).

Specifically, corresponding PAPR values in various cases are also shown in Table 15. The PAPR value is a maximum value between data and a pilot in four phase differences. It can be learned from the following table that there are only few cases in which polarity of the primary 80 M sequence and polarity of the secondary 80 M sequence need to be adjusted, and in most cases, the primary 80 M sequence and the secondary 80 M sequence are directly spliced.

TABLE 15

| Primary-secondary channel spacing (MHz) | [Primary 80 M, Secondary 80 M] [P1, P2] | PAPR (dB) | [Secondary 80 M, Primary 80 M] [P2, P1] | PAPR (dB) |
| --- | --- | --- | --- | --- |
| 80 (adjacent) | [+1, +1] | 5.48 | [+1, +1] | 5.59 |
| 100 | [+1, +1] | 5.48 | [+1, +1] | 5.51 |
| 120 | [+1, −1] | 5.58 | [+1, +1] | 5.58 |
| 140 | [+1, +1] | 5.51 | [+1, +1] | 5.47 |
| 160 | [+1, +1] | 5.63 | [−1, +1] | 5.49 |
| 180 | [+1, −1] | 5.53 | [+1, +1] | 5.65 |
| 200 | [+1, −1] | 5.61 | [+1, +1] | 5.54 |
| 220 | [+1, +1] | 5.51 | [−1, +1] | 5.51 |
| 240 | [+1, +1] | 5.59 | [+1, +1] | 5.60 |
| >240 | [+1, +1] | ~5.63 | [+1, +1] | ~5.57 |

In addition, to reduce system implementation complexity, specific PAPR performance may be selected for sacrifice. In various cases, the primary 80 M sequence and the secondary 80 M sequence are directly spliced, to obtain a 1×HE-LTF sequence in the 160 M bandwidth.

In the embodiments, all the 1×HE-LTF sequences are characterized by a good PAPR in different bandwidths, and a PAPR is characterized by extremely small fluctuation in the case of multiple spatial streams, so that a power amplifier can be effectively used, and power can be better enhanced in a long distance transmission mode to adapt to longer distance transmission.

The present embodiments may be applied to a wireless local area network that includes but is not limited to a Wi-Fi system represented by 802.11a, 802.11b, 802.11g, 802.11n, or 802.11ac; or may be applied to a next-generation Wi-Fi system or a next-generation wireless local area network system.

Figure 11:
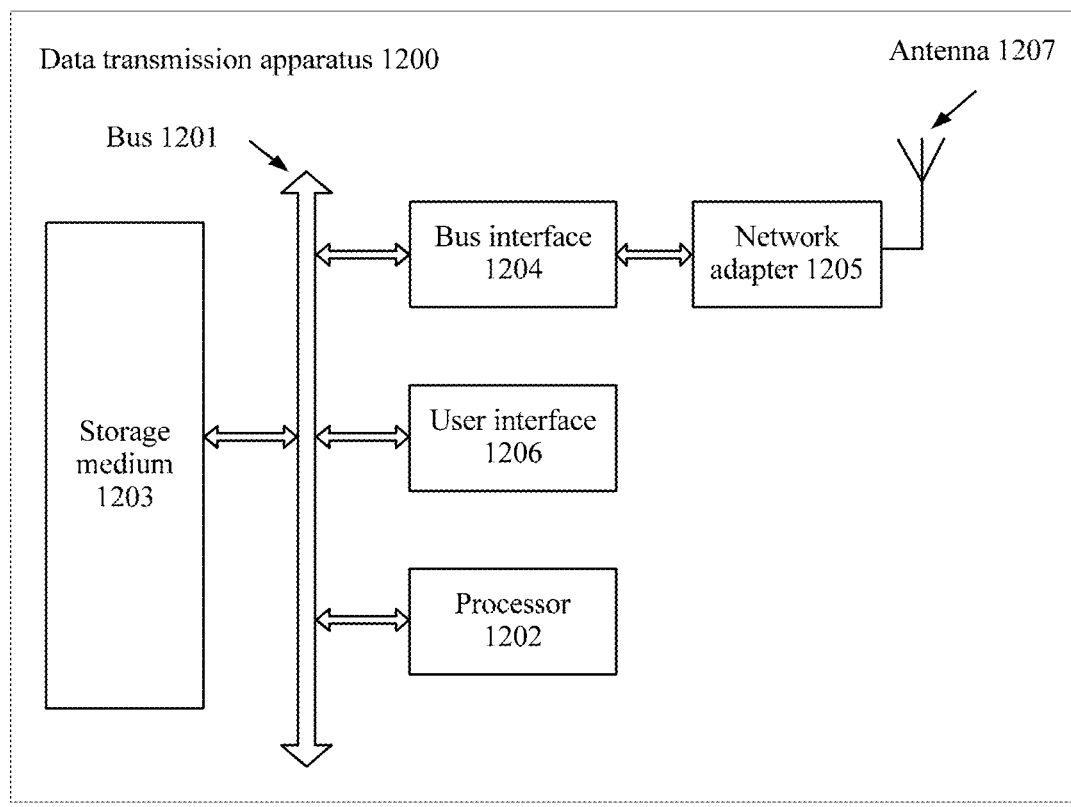
FIG. 11 is a simple schematic diagram of a data transmission apparatus in an embodiment.

It further provides a data transmission apparatus that may perform the foregoing method. FIG. 11 is an example (for example, some components in the figure such as an access point, a station, and a chip are optional) of a schematic structural diagram of a data transmission apparatus in the embodiments. As shown in FIG. 11, a data transmission apparatus 1200 may be implemented by using a bus 1201 as a general bus architecture. The bus 1201 may include any quantity of interconnected buses and bridges according to specific application and an overall design constraint condition that are of the data transmission apparatus 1200. Various circuits are connected together by using the bus 1201. These circuits include a processor 1202, a storage medium 1203, and a bus interface 1204. In the data transmission apparatus 1200, a network adapter 1205 and the like are connected via the bus 1201 by using the bus interface 1204. The network adapter 1205 may be configured to: implement a signal processing function at a physical layer in a wireless local area network, and send and receive a radio frequency signal by using an antenna 1207. A user interface 1206 may be connected to a user terminal such as a keyboard, a display, a mouse, or a joystick. The bus 1201 may be further connected to various other circuits, such as a timing source, a peripheral device, a voltage regulator, and a power management circuit. These circuits are known in the art. Therefore, details are not described.

Alternatively, the data transmission apparatus 1200 may be configured as a general-purpose processing system. The general-purpose processing system includes: one or more microprocessors that provide a processor function, and an external memory that provides at least one part of the storage medium 1203. All the components are connected to another support circuit by using an external bus architecture.

Alternatively, the data transmission apparatus 1200 may be implemented by using an ASIC (application-specific integrated circuit) that includes the processor 1202, the bus interface 1204, and the user interface 1206, and at least one part that is of the storage media 1203 and that is integrated into a single chip. Alternatively, the data transmission apparatus 1200 may be implemented by using one or more FPGAs (field programmable gate array), a PLD (programmable logic device), a controller, a state machine, gate logic, a discrete hardware component, any other appropriate circuit, or any combination of circuits that can perform various functions described in the present embodiments.

The processor 1202 is responsible for bus management and general processing (including executing software stored on the storage medium 1203). The processor 1202 may be implemented by using one or more general-purpose processors and/or dedicated processors. The processor includes, for example, a microprocessor, a microcontroller, a DSP processor, or another circuit that can execute software. Regardless of whether the software is referred to as software, firmware, middleware, micro code, hardware description language, or the like, the software should be broadly construed as an instruction, data, or any combination thereof.

It is shown in FIG. 11 that the storage medium 1203 is separated from the processor 1202. However, a person skilled in the art easily understands that the storage medium 1203 or any part of the storage medium 1203 may be located outside the data transmission apparatus 1200. For example, the storage medium 1203 may include a transmission line, a carrier waveform obtained by means of data modulation, and/or a computer product separated from a wireless node. All the media may be accessed by the processor 1202 by using the bus interface 1204. Alternatively, the storage medium 1203 or any part of the storage medium 1203 may be integrated into the processor 1202, for example, may be a cache and/or a general-purpose register.

The processor 1202 may perform the foregoing embodiment, and details are not described herein.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

What is claimed is:

1. A non-transitory computer-readable storage medium on which a program is stored, wherein the program, when executed, enables a computer to perform a method as below:
   determining a long training field (LTF) sequence in a frequency domain according to a transmission bandwidth and a mode of a LTF field; and
   sending a time-domain signal, according to the LTF sequence and a number of orthogonal frequency division multiplexing (OFDM) symbols of the LTF field;

wherein the LTF sequence in the frequency domain in a 1×LTF mode over a bandwidth includes one or more LTF sequences in a 1×LTF mode over 80 MHz channels, and the LTF sequence in a 1×LTF mode is:

$HE-LTF_{250}(-500:4:500) =$

{−1, −1, +1, +1, +1, +1, +1, −1, −1, −1, +1, +1, −1, −1, +1, −1, +1,

−1, −1, −1, −1, −1, −1, +1, +1, −1, −1, +1, −1, +1, −1, −1, −1, −1,

−1, +1, +1, −1, −1, +1, −1, +1, −1, +1, +1, +1, +1, +1, −1, −1, +1,

+1, −1, +1, −1, +1, −1, −1, −1, −1, +1, −1, −1, −1, −1, −1, −1, +1,

+1, +1, −1, −1, +1, +1, −1, +1, −1, +1, +1, +1, +1, +1, +1, −1, −1,

+1, +1, −1, +1, −1, +1, +1, +1, +1, −1, +1, +1, −1, −1, +1, −1, +1,

−1, +1, +1, +1, +1, +1, −1, −1, +1, +1, −1, +1, −1, +1, −1, −1, −1,

−1, +1, −1, +1, −1, −1, 0, −1, +1, +1, −1, −1, +1, +1, −1, −1, +1,

+1, −1, −1, +1, +1, +1, +1, +1, +1, −1, −1, +1, +1, −1, +1, −1,

+1, +1, +1, +1, +1, −1, −1, +1, +1, −1, +1, −1, +1, −1, −1, −1, −1,

−1, +1, +1, −1, −1, +1, −1, +1, −1, +1, +1, +1, +1, −1, +1, −1, −1,

+1, −1, −1, +1, +1, +1, −1, −1, +1, +1, −1, +1, −1, +1, +1, +1,

+1, +1, +1, −1, −1, +1, +1, −1, +1, −1, +1, +1, +1, +1, −1, +1,

+1, −1, −1, +1, −1, +1, −1, +1, +1, +1, +1, +1, −1, −1, +1, +1,

−1, +1, −1, +1, −1, −1, −1, −1, +1, −1, +1, −1, −1, −1, +1, +1};

wherein each value of the LTF sequence corresponds to each value on a subcarrier with indexes −500:4:500, respectively, and values on remaining subcarriers are 0.

2. The non-transitory computer-readable storage medium according to claim 1, wherein the program, when executed, further enables the computer to perform:

before determining the LTF sequence in the frequency domain, receiving a trigger frame to indicate uplink scheduling information in an uplink multi-user multiple-input multiple-output (UL-MU-MIMO) transmission, wherein the uplink scheduling information includes the transmission bandwidth and the number of OFDM symbols of the LTF field.

3. The non-transitory computer-readable storage medium according to claim 1, wherein the program, when executed, further enables the computer to perform:

determining the number of OFDM symbols of the LTF field based on a total number of space-time streams ($N_{STS}$) in a single user transmission or in a downlink multi-user multiple-input multiple-output (DL-MU-MIMO) transmission, wherein the number of OFDM symbols of the LTF field and the $N_{STS}$ correspond as follows:

| $N_{STS}$ | number of OFDM symbols of the LTF field |
|---|---|
| 1 | 1 |
| 2 | 2 |
| 3 | 4 |
| 4 | 4 |
| 5 | 6 |
| 6 | 6 |

-continued

| $N_{STS}$ | number of OFDM symbols of the LTF field |
|---|---|
| 7 | 8 |
| 8 | 8. |

4. A non-transitory computer-readable storage medium on which a program is stored, wherein the program, when executed, enables a computer to perform a method as below:
receiving a preamble that comprises a long training field (LTF); and
obtaining a channel estimation value of a corresponding subcarrier location according to the LTF field and a LTF sequence in a frequency domain;
wherein a LTF sequence in the frequency domain in a 1×LTF mode over a bandwidth includes one or more LTF sequences in a 1×LTF mode over 80 MHz channels, and the LTF sequence in a 1×LTF mode is:

$HE-LTF_{250}(-500:4:500) =$

{−1, −1, +1, +1, +1, +1, +1, −1, −1, −1, +1, +1, −1, −1, +1, −1, +1,

−1, −1, −1, −1, −1, −1, +1, +1, −1, −1, +1, −1, +1, −1, −1, −1, −1,

−1, +1, +1, −1, −1, +1, −1, +1, −1, +1, +1, +1, +1, +1, −1, −1, +1,

+1, −1, +1, −1, +1, −1, −1, −1, −1, +1, −1, −1, −1, −1, −1, −1, +1,

+1, +1, −1, −1, +1, +1, −1, +1, −1, +1, +1, +1, +1, +1, +1, −1, −1,

+1, +1, −1, +1, −1, +1, +1, +1, +1, −1, +1, +1, −1, −1, +1, −1, +1,

−1, +1, +1, +1, +1, +1, −1, −1, +1, +1, −1, +1, −1, +1, −1, −1, −1,

−1, +1, −1, +1, −1, −1, 0, −1, +1, +1, −1, −1, +1, +1, −1, −1, +1,

+1, −1, +1, −1, +1, +1, +1, +1, +1, −1, −1, +1, +1, −1, +1, −1,

+1, +1, +1, +1, +1, −1, −1, +1, +1, −1, +1, −1, +1, −1, −1, −1, −1,

−1, +1, +1, −1, −1, +1, −1, +1, −1, +1, +1, +1, +1, −1, +1, −1, −1,

+1, −1, −1, +1, +1, +1, −1, −1, +1, +1, −1, +1, −1, +1, +1, +1,

+1, +1, +1, −1, −1, +1, +1, −1, +1, −1, +1, +1, +1, +1, −1, +1,

+1, −1, −1, +1, −1, +1, −1, +1, +1, +1, +1, +1, −1, −1, +1, +1,

−1, +1, −1, +1, −1, −1, −1, −1, +1, −1, +1, −1, −1, −1, +1, +1};

wherein each value of the LTF sequence corresponds to each value on subcarrier with indexes −500:4:500, respectively, and values on remaining subcarriers are 0.

5. The non-transitory computer-readable storage medium according to claim 4, wherein the program, when executed, further enables the computer to perform:
before receiving the preamble that comprises the LTF field, sending a trigger frame to indicate uplink scheduling information in an uplink multi-user multiple-input multiple-output (UL-MU-MIMO) transmission, wherein the uplink scheduling information includes a transmission bandwidth and a number of orthogonal frequency division multiplexing (OFDM) symbols of the LTF field.

6. The non-transitory computer-readable storage medium according to claim 4, wherein the program, when executed, further enables the computer to perform:
obtaining a transmission bandwidth and a mode of the LTF field according to information carried in a signal field in the preamble in a single user transmission or in a downlink multi-user multiple-input multiple-output (DL-MU-MIMO) transmission; and determining the LTF sequence in the frequency domain according to the transmission bandwidth and the mode of the LTF.

7. A method for channel estimation information transmission, the method comprising:

determining, by an apparatus, a long training field (LTF) sequence in a frequency domain according to a transmission bandwidth and a mode of a LTF field; and sending, by the apparatus, a time-domain signal, according to the LTF sequence and a number of orthogonal frequency division multiplexing (OFDM) symbols of the LTF field;

wherein the LTF sequence in the frequency domain in a 1×LTF mode over a bandwidth includes one or more LTF sequences in a 1×LTF mode over 80 MHz channels, and the LTF sequence in a 1×LTF mode is:

$HE-LTF_{250}(-500:4:500) =$

{−1, −1, +1, +1, +1, +1, +1, −1, −1, −1, +1, +1, −1, −1, +1, −1, +1,

−1, −1, −1, −1, −1, −1, +1, +1, −1, −1, +1, −1, +1, −1, −1, −1, −1,

−1, +1, +1, −1, −1, +1, −1, +1, −1, +1, +1, +1, +1, +1, +1, −1, −1, +1,

+1, −1, +1, −1, +1, −1, −1, −1, −1, +1, −1, −1, −1, −1, −1, −1, +1,

+1, +1, −1, −1, +1, +1, −1, +1, −1, +1, +1, +1, +1, +1, +1, −1, −1,

+1, +1, −1, +1, −1, +1, +1, +1, +1, −1, +1, +1, −1, −1, +1, −1, +1,

−1, +1, +1, +1, +1, +1, −1, −1, +1, −1, +1, −1, +1, −1, −1, −1,

−1, +1, −1, +1, −1, −1, 0, −1, +1, +1, −1, −1, +1, +1, −1, −1, +1,

+1, −1, +1, −1, +1, +1, +1, +1, +1, −1, −1, +1, +1, −1, +1, −1,

+1, +1, +1, +1, +1, −1, −1, +1, +1, −1, +1, −1, +1, −1, −1, −1, −1,

−1, +1, +1, −1, −1, +1, −1, +1, −1, +1, +1, +1, +1, −1, +1, −1, −1,

+1, −1, −1, +1, +1, +1, −1, −1, +1, +1, −1, +1, −1, +1, +1, +1,

+1, +1, +1, −1, −1, +1, +1, −1, +1, −1, +1, +1, +1, +1, −1, +1,

+1, −1, −1, +1, −1, +1, −1, +1, +1, +1, +1, +1, −1, −1, +1, +1,

−1, +1, −1, +1, −1, −1, −1, −1, +1, −1, +1, −1, −1, −1, +1, +1};

wherein each value of the LTF sequence corresponds to each value on a subcarrier with indexes −500:4:500, respectively, and values on remaining subcarriers are 0.

8. The method according to claim 7, further comprising:
before determining the LTF sequence in the frequency domain, receiving a trigger frame to indicate uplink scheduling information in an uplink multi-user multiple-input multiple-output (UL-MU-MIMO) transmission, wherein the uplink scheduling information includes the transmission bandwidth and the number of OFDM symbols of the LTF field.

9. The method according to claim 7, further comprising:
determining the number of OFDM symbols of the LTF field based on a total number of space-time streams ($N_{STS}$) in a single user transmission or in a downlink multi-user multiple-input multiple-output (DL-MU-MIMO) transmission, wherein the number of OFDM symbols of the LTF field and the $N_{STS}$ correspond as follows:

| $N_{STS}$ | number of OFDM symbols of the LTF field |
|---|---|
| 1 | 1 |
| 2 | 2 |
| 3 | 4 |
| 4 | 4 |
| 5 | 6 |
| 6 | 6 |
| 7 | 8 |
| 8 | 8. |

10. A method for channel estimation information processing, the method comprising:

receiving, by an apparatus, a preamble that comprises a long training field (LTF); and obtaining, by the apparatus, a channel estimation value of a corresponding subcarrier location according to the LTF field and a LTF sequence in a frequency domain;

wherein a LTF sequence in the frequency domain in a 1×LTF mode over a bandwidth includes one or more LTF sequences in a 1×LTF mode over 80 MHz channels, and the LTF sequence in a 1×LTF mode is:

$HE - LTF_{250}(-500:4:500) =$

{−1, −1, +1, +1, +1, +1, +1, −1, −1, −1, +1, +1, −1, −1, +1

1, +1, −1, −1, −1, −1, −1, −1, +1, +1, −1, −1, +1,

−1, +1, −1, −1, −1, −1, −1, +1, +1, −1, −1, +1,

−1, +1, −1, +1, +1, +1, +1, +1, −1, −1, +1, +1, −1,

+1, −1, +1, −1, −1, −1, −1, +1, −1, −1, −1, −

1, −1, −1, +1, +1, +1, −1, −1, +1, −1, +1, −1,

+1, +1, +1, +1, +1, +1, −1, −1, +1, +1, −1, +1,

−1, +1, +1, +1, +1, −1, +1, +1, −1, −1, +1, −1,

+1, −1, +1, +1, +1, +1, +1, −1, −1, +1, +1, −1,

+1, −1, +1, −1, −1, −1, −1, +1, −1, +1, −1, −1, 0,

−1, +1, +1, −1, −1, +1, +1, −1, −1, +1, +1, −1,

+1, −1, +1, +1, +1, +1, +1, +1, −1, −1, +1, +1, −1,

+1, −1, +1, +1, +1, +1, +1, −1, −1, +1, +1, −

1, +1, −1, +1, −1, −1, −1, −1, −1, +1, +1, −1, −1,

+1, −1, +1, −1, +1, +1, +1, +1, −1, +1, −1, −1,

+1, −1, −1, +1, +1, +1, −1, −1, +1, +1, −1, +1,

−1, +1, +1, +1, +1, +1, +1, −1, −1, +1, +1, −1,

+1, −1, +1, +1, +1, −1, +1, +1, −1, −1, +1, −1,

+1, −1, +1, +1, +1, +1, +1, −1, −1, +1, +1, −

1, +1, −1, +1, −1, −1, −1, −1, +1, −1, +1, −1, −1, −1, +1, +1};

wherein each value of the LTF sequence corresponds to each value on subcarrier with indexes −500:4:500, respectively, and values on remaining subcarriers are 0.

11. The method according to claim 10, further comprising:

before receiving the preamble that comprises the LTF field, sending a trigger frame to indicate uplink scheduling information in an uplink multi-user multiple-input multiple-output (UL-MU-MIMO) transmission, wherein the uplink scheduling information includes a transmission bandwidth and a number of orthogonal frequency division multiplexing (OFDM) symbols of the LTF field.

12. The method according to claim 10, further comprising:
 obtaining a transmission bandwidth and a mode of the LTF field according to information carried in a signal field in the preamble in a single user transmission or in a downlink multi-user multiple-input multiple-output (DL-MU-MIMO) transmission; and
 determining the LTF sequence in the frequency domain according to the transmission bandwidth and the mode of the LTF.

\* \* \* \* \*